United States Patent
More et al.

(10) Patent No.: US 12,449,182 B2
(45) Date of Patent: Oct. 21, 2025

(54) REFRIGERATION APPLIANCE INCLUDING A REFRIGERANT LINE AND WATER LINE EXTENDING THROUGH COMMON PASS-THROUGH OF A VACUUM-INSULATED STRUCTURE

(71) Applicant: WHIRLPOOL CORPORATION, Benton Harbor, MI (US)

(72) Inventors: Anup Bapu More, Pimpri-Chinchwad (IN); Rahul Subhash Chhajed, Stevensville, MI (US); Digeshwar Hemraj Harinkhede, Nagpur (IN); Vishal Brahmanand Chauhan, Palghar (IN); Kapil Devidas Bet, Solapur (IN); Abinash Sarma, Tinsukia (IN)

(73) Assignee: Whirlpool Corporation, Benton Harbor, MI (US)

( * ) Notice: Subject to any disclaimer, the term of this patent is extended or adjusted under 35 U.S.C. 154(b) by 257 days.

(21) Appl. No.: 18/098,759

(22) Filed: Jan. 19, 2023

(65) Prior Publication Data
US 2024/0247860 A1    Jul. 25, 2024

(51) Int. Cl.
*F25D 17/02* (2006.01)
*F25B 41/40* (2021.01)
(Continued)

(52) U.S. Cl.
CPC .............. *F25D 17/02* (2013.01); *F25B 41/40* (2021.01); *F25D 21/14* (2013.01); *F25D 23/065* (2013.01)

(58) Field of Classification Search
CPC ........ F25D 17/02; F25D 21/14; F25D 23/065; F25D 11/022; F25D 23/126;
(Continued)

(56) References Cited

U.S. PATENT DOCUMENTS 1,791,503 A * 2/1931 Hull .................. F25B 39/02
62/227
1,830,060 A * 11/1931 Holbrook .............. F25D 23/065
62/DIG. 13
(Continued)

FOREIGN PATENT DOCUMENTS

DE            4242288 A1 *  6/1994   ............... H02G 3/22
DE     102015008159 A1 *  7/2016   ............ F16L 59/065
(Continued)

OTHER PUBLICATIONS

DE-4242288-A1, machine translation (Year: 2024).*
JP-2000039254-A, machine translation (Year: 2024).*
DE-102015008159-A1, machine translation (Year: 2024).*

*Primary Examiner* — Len Tran
*Assistant Examiner* — Kirstin U Oswald
(74) *Attorney, Agent, or Firm* — Price Heneveld LLP

(57) ABSTRACT

A refrigeration appliance includes: (i) a vacuum-insulated structure defining a refrigerable compartment, the vacuum-insulated structure comprising a pass-through therethrough providing access from an external environment to the refrigerable compartment; (ii) an evaporator disposed within the refrigerable compartment, the evaporator configured to lower or maintain a temperature of the refrigerable compartment below ambient temperature; (iii) a refrigerant line that extends through the pass-through and into the refrigerable compartment, the refrigerant line in fluid communication with the evaporator; (iv) a water line extending through the pass-through and into the refrigerable compartment; and (v) a housing that at least partially houses the evaporator within the refrigerable compartment, the housing comprising a wall proximate the pass-through that separates the water line from the refrigerant line where the water line and the refrigerant line extend from the pass-through and into the refrigerable compartment.

19 Claims, 27 Drawing Sheets

(51) Int. Cl.
*F25D 21/14* (2006.01)
*F25D 23/06* (2006.01)

(58) Field of Classification Search
CPC ...... F25D 2201/14; F25D 11/02; F25D 21/04; F25D 23/062; F25B 41/40; F16L 59/065
USPC .......................................................... 62/285
See application file for complete search history.

(56) References Cited

U.S. PATENT DOCUMENTS

| | | | | |
|---|---|---|---|---|
| 2,251,960 A * | 8/1941 | Smith | ...................... | F24F 1/022 62/262 |
| 2,686,662 A * | 8/1954 | Smith | ...................... | F24F 3/14 165/154 |
| 2,688,235 A * | 9/1954 | Schwenker | ............. | F25D 21/14 62/289 |
| 2,909,910 A * | 10/1959 | Saunders | ................ | F25D 21/14 62/277 |
| 3,099,914 A * | 8/1963 | De Witt | .................. | F25D 21/14 62/289 |
| 3,263,440 A * | 8/1966 | Hellstrom | ............. | F25D 11/022 62/298 |
| 3,835,661 A * | 9/1974 | Kochendorfer | ........... | F25C 1/25 62/340 |
| 3,866,434 A * | 2/1975 | Pugh | ........................ | F25C 1/25 62/340 |
| 4,020,644 A * | 5/1977 | True, Jr. | .................... | F25C 1/25 62/DIG. 13 |
| 4,097,096 A * | 6/1978 | Kochendorfer | ....... | F25D 23/065 62/81 |
| 4,165,105 A * | 8/1979 | Hahn | ...................... | F16L 5/06 285/19 |
| 4,180,297 A * | 12/1979 | Abrams | ................ | F25D 23/065 16/2.2 |
| 4,186,945 A * | 2/1980 | Hahn | .................... | F25D 23/065 285/19 |
| 4,715,512 A * | 12/1987 | Buchser | ................ | F25D 23/065 277/606 |
| 5,335,988 A * | 8/1994 | Lynn | ..................... | F25D 23/064 312/406 |
| 5,499,514 A * | 3/1996 | Ho | .......................... | F25D 21/14 62/410 |
| 5,941,619 A * | 8/1999 | Stieben | .................. | F25D 23/028 312/405 |
| 6,736,472 B2 * | 5/2004 | Banicevic | ............ | F25D 23/068 312/401 |
| 8,117,865 B2 * | 2/2012 | Allard | .................. | H05K 5/0247 62/449 |
| 9,752,818 B2 * | 9/2017 | Naik | ...................... | F25D 23/028 |
| 10,222,112 B2 * | 3/2019 | Gaplikow | ................ | F25C 5/22 |
| 10,914,511 B2 | 2/2021 | Naik et al. | | |
| 11,175,089 B2 * | 11/2021 | Marinello | ............. | F25D 23/061 |
| 2004/0107727 A1 * | 6/2004 | Kim | ........................ | F25B 41/37 62/504 |
| 2004/0261433 A1 * | 12/2004 | Gnadinger | ................ | F25C 1/04 62/344 |
| 2005/0138954 A1 * | 6/2005 | Kim | ........................ | F25D 21/14 62/418 |
| 2006/0260351 A1 * | 11/2006 | Coulter | ................. | F25D 23/063 62/340 |
| 2010/0295435 A1 * | 11/2010 | Kendall | ................. | F25D 23/028 312/401 |
| 2011/0192180 A1 * | 8/2011 | Henderson | ............ | F24H 15/136 62/156 |
| 2011/0209483 A1 * | 9/2011 | Hall | .......................... | F25C 1/18 62/340 |
| 2011/0234074 A1 * | 9/2011 | Dolinsek | .................. | H02G 3/04 62/340 |
| 2012/0272670 A1 | 11/2012 | Choi et al. | | |
| 2012/0297815 A1 * | 11/2012 | DeVos | ...................... | F25C 5/08 62/340 |
| 2013/0313267 A1 | 11/2013 | Horio et al. | | |
| 2014/0150484 A1 * | 6/2014 | Boarman | ................ | F25B 27/00 62/238.1 |
| 2017/0138656 A1 * | 5/2017 | Pfeiffer | .................. | F25D 23/068 |
| 2017/0176092 A1 * | 6/2017 | Naik | ...................... | F25D 23/00 |
| 2019/0056166 A1 | 2/2019 | Kerstner et al. | | |
| 2019/0128595 A1 * | 5/2019 | Gan | ........................ | F25D 23/126 |
| 2020/0033049 A1 * | 1/2020 | Dherde | .................. | F16L 59/121 |
| 2020/0224957 A1 | 7/2020 | Gomes et al. | | |
| 2021/0055037 A1 | 2/2021 | Jung et al. | | |
| 2021/0190413 A1 * | 6/2021 | Marinello | ............. | F25D 23/061 |

FOREIGN PATENT DOCUMENTS

JP 2000039254 A * 2/2000
WO 2004074752 A1 9/2004

* cited by examiner

REFRIGERATION APPLIANCE INCLUDING A REFRIGERANT LINE AND WATER LINE EXTENDING THROUGH COMMON PASS-THROUGH OF A VACUUM-INSULATED STRUCTURE

BACKGROUND OF THE DISCLOSURE

The present disclosure generally relates to a refrigeration appliance and more specifically, to a refrigeration appliance that includes a refrigerant line and a water line extending through a common pass-through of a vacuum-insulated structure.

Some refrigerators incorporate a vacuum-insulated structure. The vacuum-insulated structure may separate a refrigeration compartment from a freezer compartment. It is desirable to offer ice and water dispensing capability within the refrigeration compartment and ice-making capability within the freezer compartment. Each capability would require pass-throughs through the vacuum-insulated structure to transport water from a source external to the refrigerator to a water dispenser within the refrigeration compartment and an ice-maker within the freezer compartment. However, there is a problem in that each pass-through placed through the vacuum-insulated structure decreases the likelihood that reduced pressure can be maintained within the vacuum-insulated structure.

SUMMARY OF THE DISCLOSURE

The present disclosure solves that problem by routing a refrigerant line and a water line through the same pass-through through the vacuum-insulated structure into the desired compartment (e.g., the refrigerator compartment). This arrangement avoids the creation of additional pass-throughs through the vacuum-insulated structure. A grommet can be utilized to seal the pass-through. The water line and the refrigerant line extend through the grommet in a sealed manner.

The present disclosure further recognizes that disposing the water line in close proximity to the refrigerant line poses an additional problem in that the close proximity might cause water within the water line to freeze, making a water dispenser or ice-maker in communication with the water line inoperable. The refrigerant line can be below the freezing point of water, and may extract heat from the water line when the refrigerant line and the water line are in close proximity extending through the pass-through.

The present disclosure further addresses that issue in several ways. In some instances, a drain tube is used to transport the water that condenses upon the evaporator within the refrigerated compartment, and the drain tube is also directed through the pass-through along with the water line and the refrigerant line. The water within the drain line increases the total heat that the refrigerant line must extract to cause the water within the water line to freeze. Further, the drain line can be positioned to act as a thermal buffer between the refrigerant line and the water line.

In some instances, the refrigeration appliance further includes a housing that houses the evaporator, and the housing includes a wall that physically separates the refrigerant line and the water line at the point of entry into the grommet from the refrigerated compartment. The wall thus decreases the ability of the refrigerant line to freeze the water within the water line.

In some instances, the water line includes a conduit portion with a larger diameter than the water line leading up to the conduit portion. In addition, the conduit portion extends through the grommet at an angle downward into the refrigerated compartment. The angle and the larger inner diameter allow water to flow via the force of gravity into the refrigerated compartment (e.g., to a reservoir or an ice-maker) and prevent water from residing within the water line in the vicinity of the grommet near the refrigerant line. The lack of water within the water line near the refrigerant line prevents frozen blockage within the water line.

According to one aspect of the present disclosure, a refrigeration appliance comprises: (i) a vacuum-insulated structure defining a refrigerable compartment, the vacuum-insulated structure comprising a pass-through therethrough providing access from an external environment to the refrigerable compartment; (ii) an evaporator disposed within the refrigerable compartment, the evaporator configured to lower or maintain a temperature of the refrigerable compartment below ambient temperature; (iii) a refrigerant line that extends through the pass-through and into the refrigerable compartment, the refrigerant line in fluid communication with the evaporator; (iv) a water line extending through the pass-through and into the refrigerable compartment; and (v) a housing that at least partially houses the evaporator within the refrigerable compartment, the housing comprising a wall proximate the pass-through that separates the water line from the refrigerant line where the water line and the refrigerant line extend from the pass-through and into the refrigerable compartment.

According to another aspect of the present disclosure, a refrigeration appliance comprises: (a) a vacuum-insulated structure defining a refrigerator compartment and a freezer compartment, the vacuum-insulated structure comprising (i) a refrigerator pass-through therethrough providing access from an external environment to the refrigerator compartment and (ii) a freezer pass-through therethrough providing access from the external environment to the freezer compartment; (b) a refrigerator evaporator disposed within the refrigerator compartment, the refrigerator evaporator configured to lower or maintain a temperature of the refrigerator compartment below ambient temperature; (c) a freezer evaporator disposed within the freezer compartment, the freezer evaporator configured to lower or maintain a temperature of the freezer compartment below ambient temperature; (d) a refrigerator refrigerant line that extends through the refrigerator pass-through and into the refrigerator compartment, the refrigerator refrigerant line in fluid communication with the evaporator; (e) a freezer refrigerant line that extends through the freezer pass-through and into the freezer compartment, the freezer refrigerant line in fluid communication with the evaporator; (f) a refrigerator water line extending through the refrigerator pass-through and into the refrigerator compartment; (g) a freezer water line extending through the freezer pass-through and into the freezer compartment; (h) a refrigerator housing that at least partially houses the refrigerator evaporator within the refrigerator compartment, the refrigerator housing comprising a wall proximate the refrigerator pass-through that separates the refrigerator water line from the refrigerator refrigerant line where the refrigerator water line and the refrigerator refrigerant line extend from the refrigerator pass-through and into the refrigerator compartment; and (i) a freezer housing that at least partially houses the freezer evaporator within the freezer compartment, the freezer housing comprising a wall proximate the freezer pass-through that separates the freezer water line from the freezer refrigerant line where the freezer water line and the freezer refrigerant line extend from the freezer pass-through and into the freezer compartment.

According to yet another aspect of the present disclosure, a refrigeration appliance comprises: (a) a vacuum-insulated structure defining a freezer compartment, the vacuum-insulated structure comprising (i) a freezer pass-through therethrough providing access from an external environment to the freezer compartment; (b) an ice-maker disposed within the freezer compartment; and (c) a freezer water line extending through the freezer pass-through and into the freezer compartment, the freezer water line comprising a conduit portion with an open end in fluid communication with the ice-maker; wherein, the conduit portion extends through the freezer pass-through at an acute angle relative to horizontal so that water is able to flow via the force of gravity through the conduit portion and into the ice-maker.

These and other features, advantages, and objects of the present disclosure will be further understood and appreciated by those skilled in the art by reference to the following specification, claims, and appended drawings.

Figure 1:
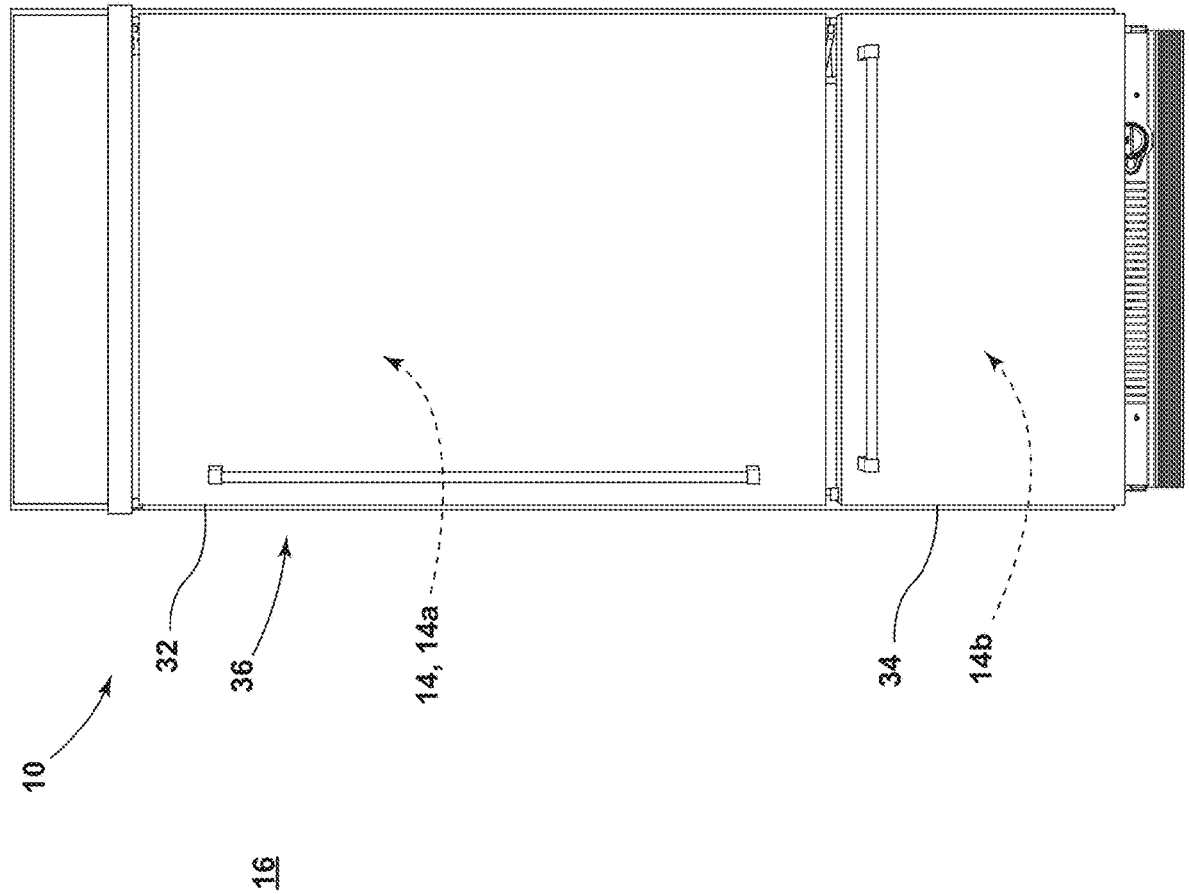
FIG. 1 is an elevational view of a refrigeration appliance of the present disclosure, illustrating refrigerable compartments in the form of a refrigeration compartment disposed above a freezer compartment access to which is denied from an external environment due to a door and a drawer being in their respective closed positions.

The components in the figures are not necessarily to scale, emphasis instead being placed upon illustrating the principles described herein.

DETAILED DESCRIPTION

The present illustrated embodiments reside primarily in combinations of method steps and apparatus components related to a refrigeration appliance. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Figure 2:
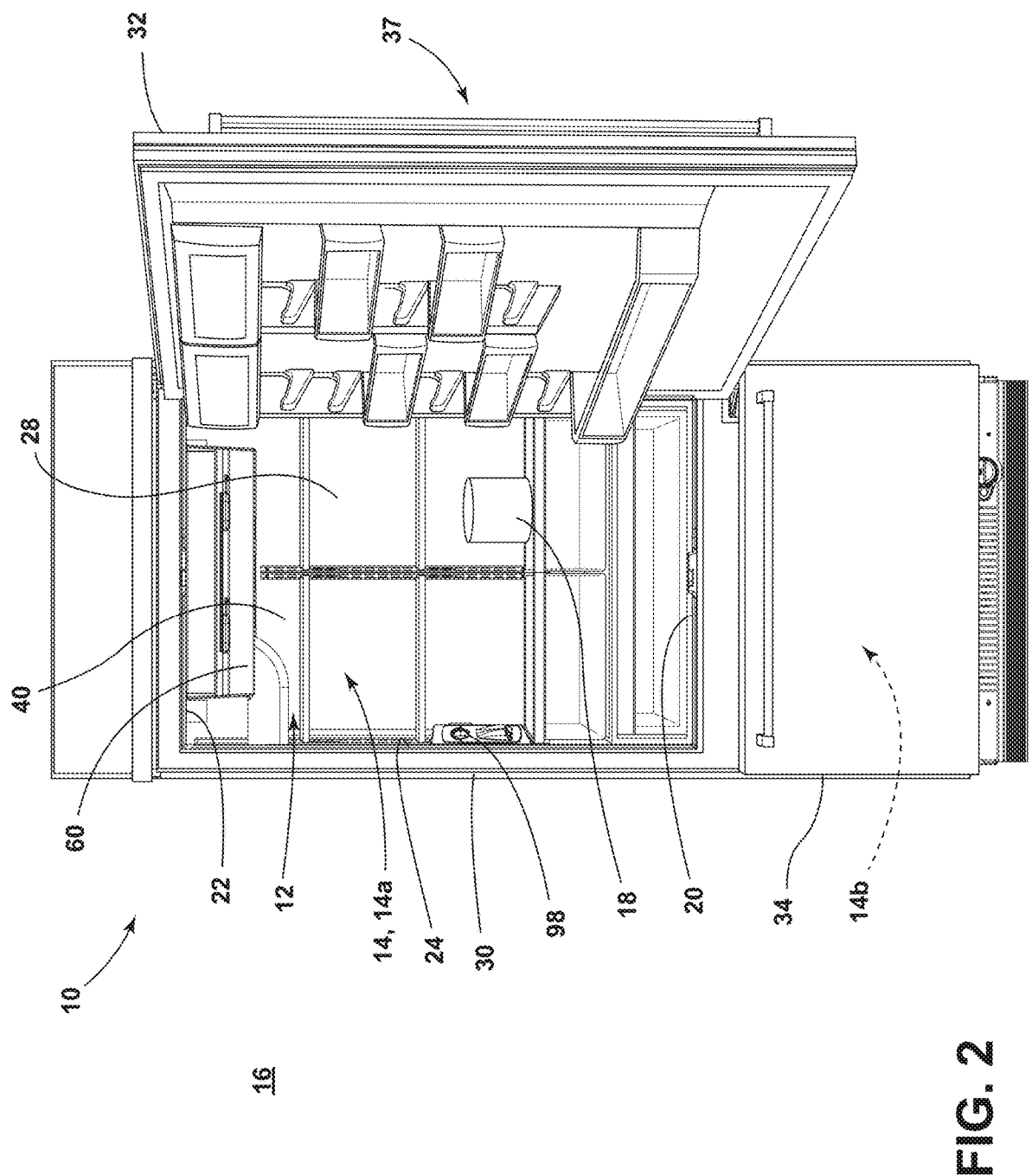
FIG. 2 is the same elevational view as FIG. 1, but this time illustrating (i) the door to the refrigeration compartment in an open position allowing access to the refrigeration compartment from the external environment such as to deposit a food item therein and (ii) the refrigeration appliance including a vacuum-insulated structure.
Figure 3:
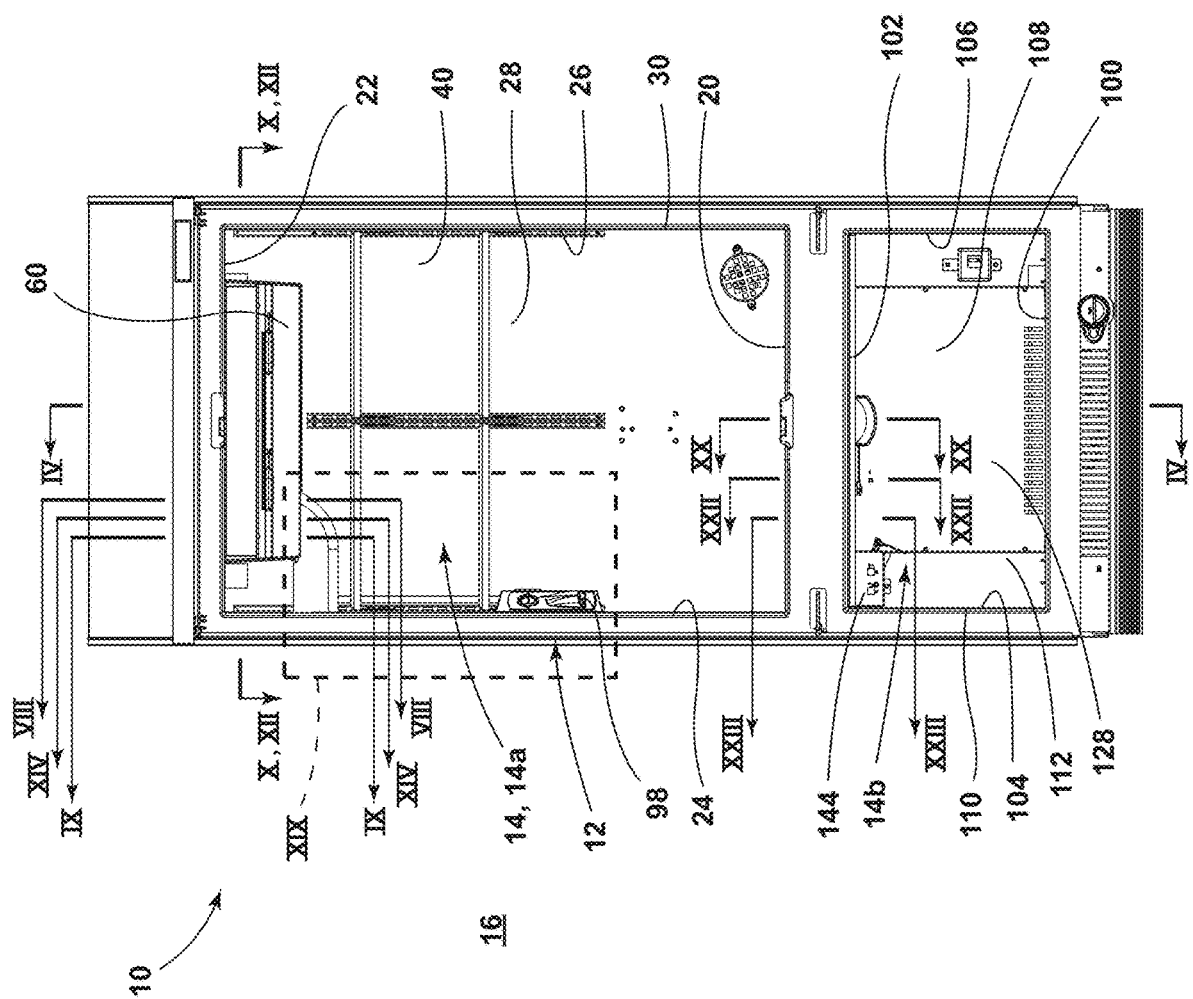
FIG. 3 is an elevational view of a front side of the vacuum-insulated structure of FIG. 2, illustrating an inner wall of the vacuum-insulated structure defining the refrigeration compartment disposed above a freezer inner wall of the vacuum-insulated structure defining the freezer compartment.

Referring to FIGS. 1-3, a refrigeration appliance 10 includes a vacuum-insulated structure 12 that defines at least one refrigerable compartment 14. For example, as in the illustrated embodiment, the refrigeration appliance 10 defines two refrigerable compartments 14—a refrigerator compartment 14a and a freezer compartment 14b. In use, the refrigerator compartment 14a and the freezer compartment 14b are maintained at different temperatures. For example, the refrigerator compartment 14a can be configured to maintain a temperature above 0° C. but below ambient temperature of an external environment 16, such as a within a range of from greater than 0° C. to 8° C. The refrigerator compartment 14a is used to maintain a food item 18 disposed therein at a cold but not freezing temperature to prolong the usable life of the food item 18. The freezer compartment 14b can be configured to maintain a temperature that is less than or equal to 0° C. The freezer compartment 14b is used to maintain the food item 18 disposed therein a frozen state to prolong the usable life of the food item 18. The refrigerator compartment 14a can be disposed above the freezer compartment 14b, as in the illustrated embodiments, although other configurations are possible (e.g., side-by-side, top mount freezer compartment 14b, and so on).

In embodiments, the refrigerable compartment 14 includes a floor 20, a ceiling 22 opposing the floor 20, a sidewall 24, a sidewall 26 opposing the sidewall 24, and a rear wall 28. The refrigerable compartment 14 has an opening 30 thereto. The rear wall 28 is disposed rearward 80 of the opening 30.

The refrigeration appliance 10 includes one or more doors 32 and/or drawers 34 providing selective access to the refrigerable compartment 14 through the opening 30 from the external environment 16. For example, as in the illustrated embodiment, the refrigeration appliance 10 can include the door 32 that provides selective access to the refrigerator compartment 14a and the drawer 34 that provides selective access to the freezer compartment 14b. The door 32 can move to, from, and between a closed position 36 (FIG. 1) where the opening 30 is covered and access from the external environment 16 to the refrigerator compartment 14a is denied to an open position 37 (FIG. 2) where the opening 30 is open and access from the external environment 16 to the refrigerator compartment 14a is allowed. The drawer 34 of course can be manipulated in the same manner (not illustrated).

Figure 4:
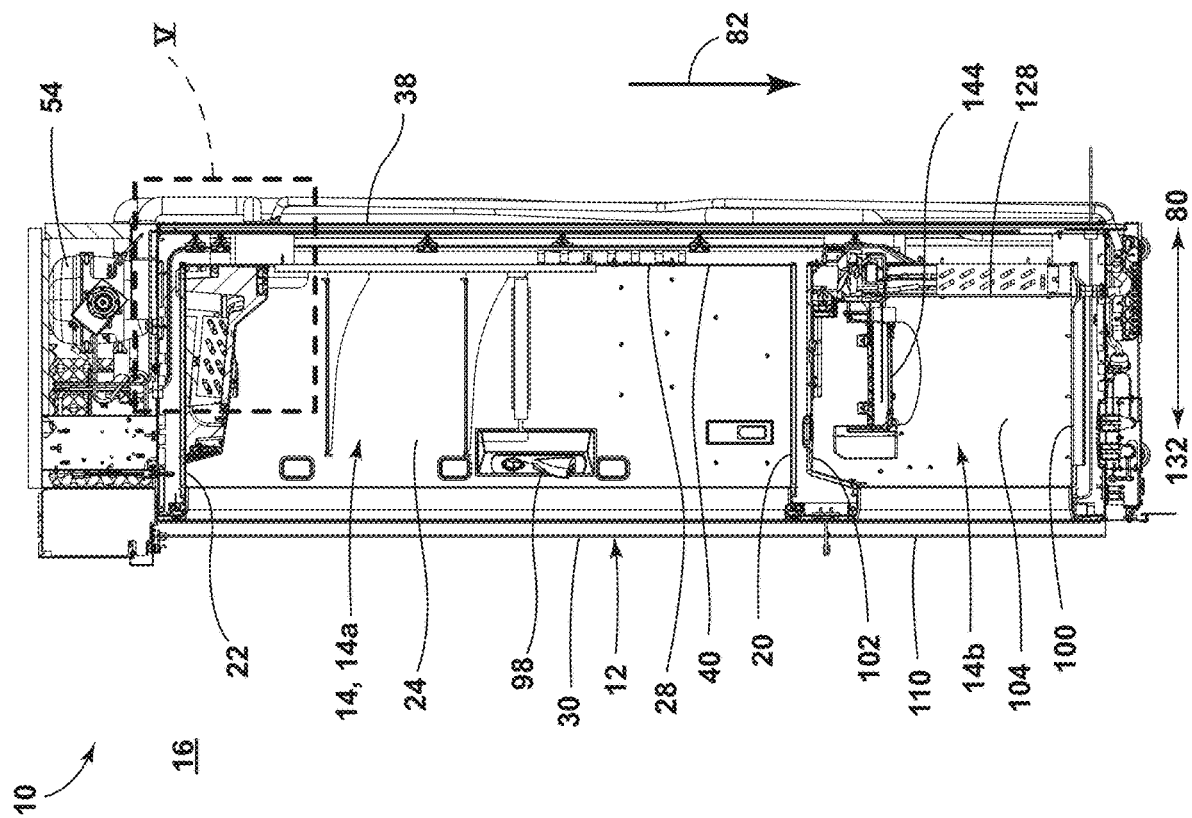
FIG. 4 is an elevation view of a cross-section of the vacuum-insulated structure taken through line IV-IV of FIG. 3, illustrating a water dispenser disposed in the refrigerator compartment and an ice-maker disposed in the freezer compartment.
Figure 5:
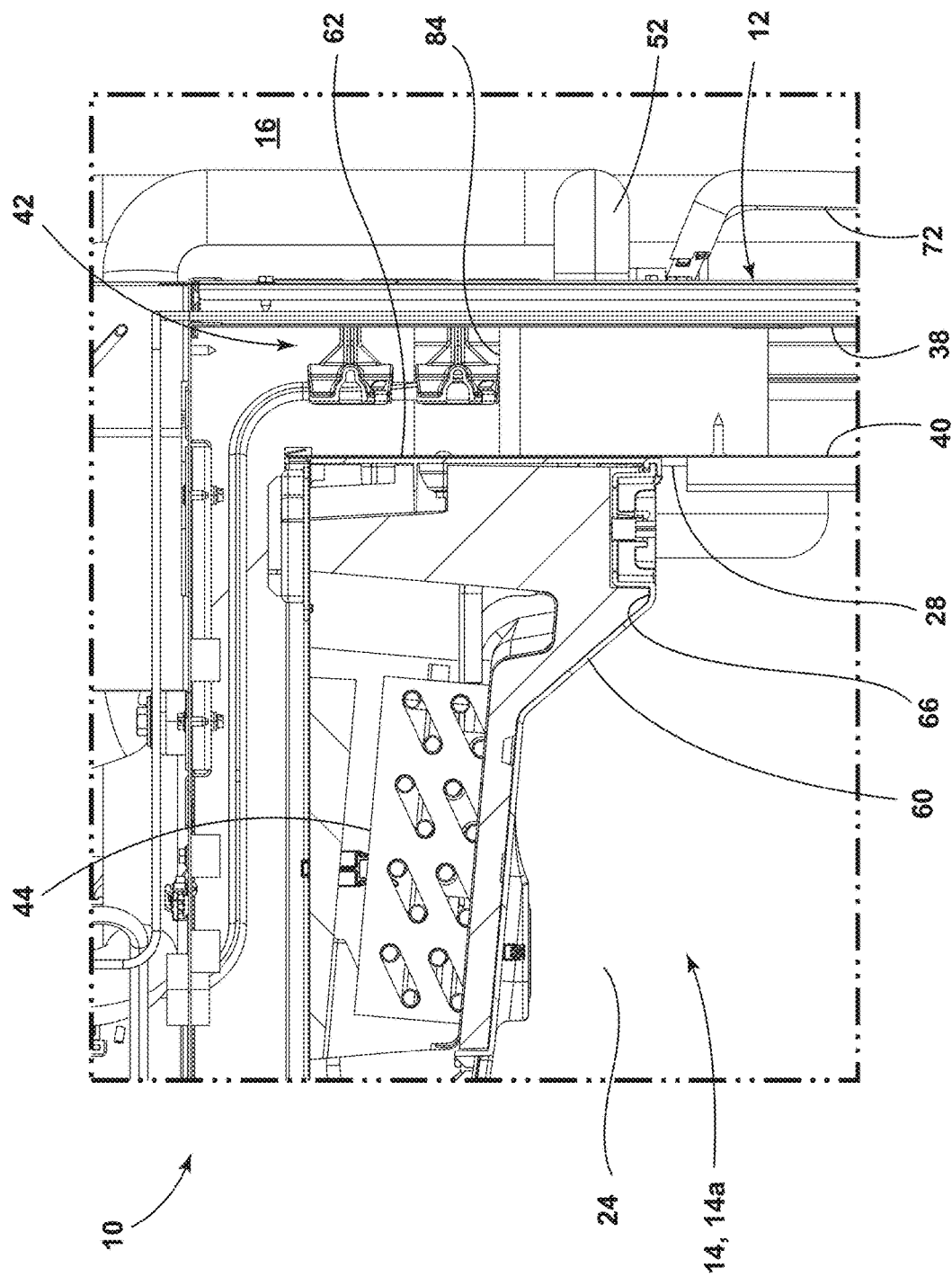
FIG. 5 is a magnified view of area V of FIG. 4, illustrating the vacuum-insulated structure including (i) an inner wall defining the refrigerator compartment and an outer wall separated from the inner wall by a space maintained at a pressure that is less than atmospheric pressure and (ii) an evaporator disposed within the refrigerator compartment.

Referring now to FIGS. 4 and 5, the vacuum-insulated structure 12 includes an outer wall 38 and an inner wall 40. The outer wall 38 faces the inner wall 40. The outer wall 38 at least partially surrounds the inner wall 40. A space 42 separates the outer wall 38 from the inner wall 40. In use, the space 42 has a pressure that is less than ambient pressure of the external environment 16. The space 42 may contain vacuum core material (not illustrated), such as fumed silica, among other options. The reduced pressure within the space 42 relative to the ambient pressure of the external environment 16 helps reduce heat transfer from the external environment 16 into the refrigerable compartment 14. In embodiments, as that illustrated, the inner wall 40 of the vacuum-insulated structure 12 provides the floor 20, the sidewalls 24, 26, the ceiling 22, and the rear wall 28 of the refrigerable compartment 14.

The refrigeration appliance 10 further includes an evaporator 44. The evaporator 44 is disposed within the refrigerable compartment 14, such as the refrigerator compartment 14a as illustrated. The evaporator 44 is disposed to the inside of the inner wall 40 of the vacuum-insulated structure 12. The evaporator 44 withdraws heat from the refrigerable compartment 14 in order to maintain the temperature of the refrigerable compartment 14 below ambient temperature. In the instance of the refrigerator compartment 14a, the evaporator 44 withdraws heat therefrom to maintain the temperature within the refrigerator compartment 14a at the desired temperature, such as within the range of from greater than 0° C. to 8° C. In embodiments, such as that illustrated, the evaporator 44 is disposed adjacent the ceiling 22 and rear wall 28 of the refrigerable compartment 14. The evaporator 44 can be horizontally oriented.

Figure 6:
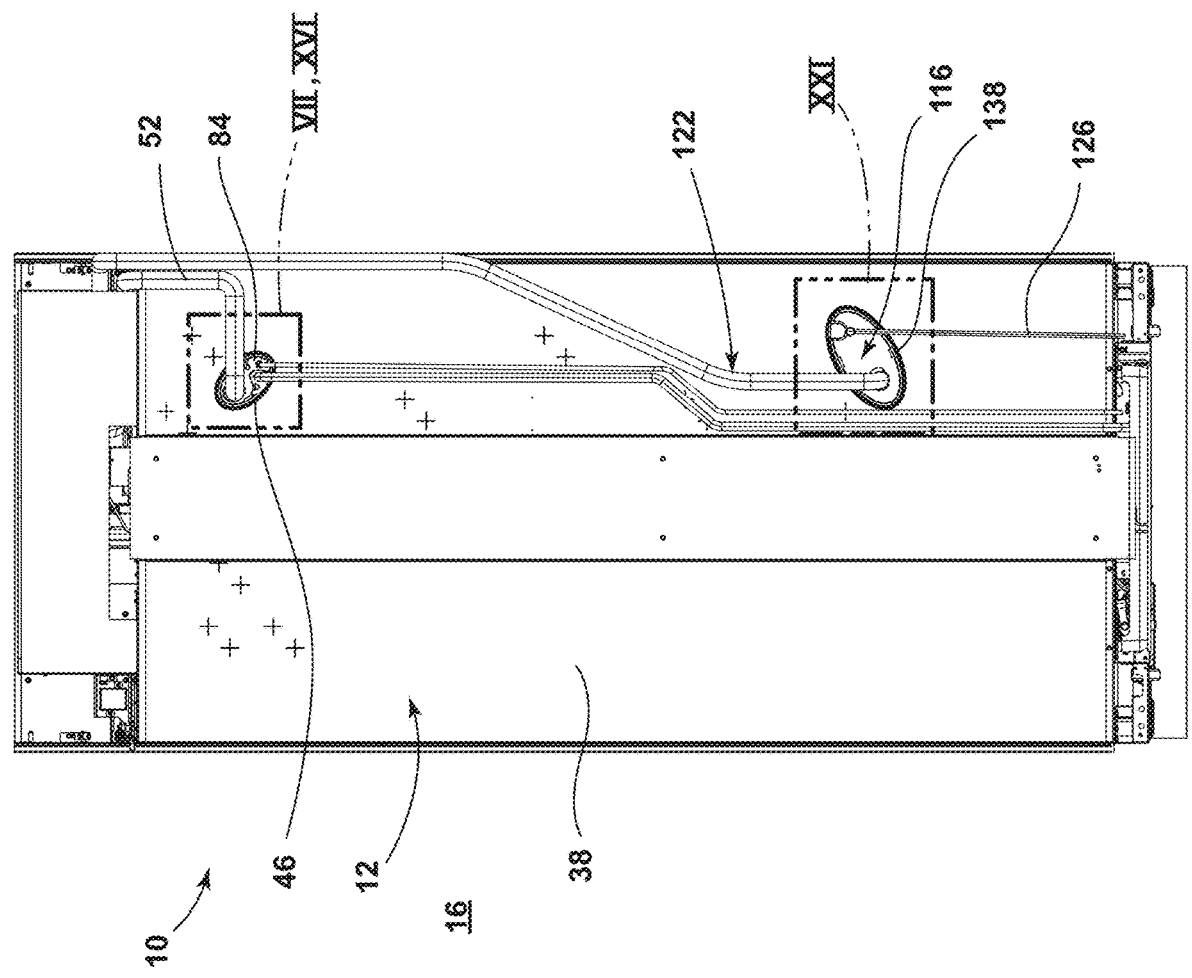
FIG. 6 is an elevational view of a rear side of the vacuum-insulated structure of FIG. 2, illustrating the vacuum-insulated structure including a pass-through from the external environment into the refrigeration compartment and a freezer pass-through from the external environment into the freezer compartment.
Figure 7:
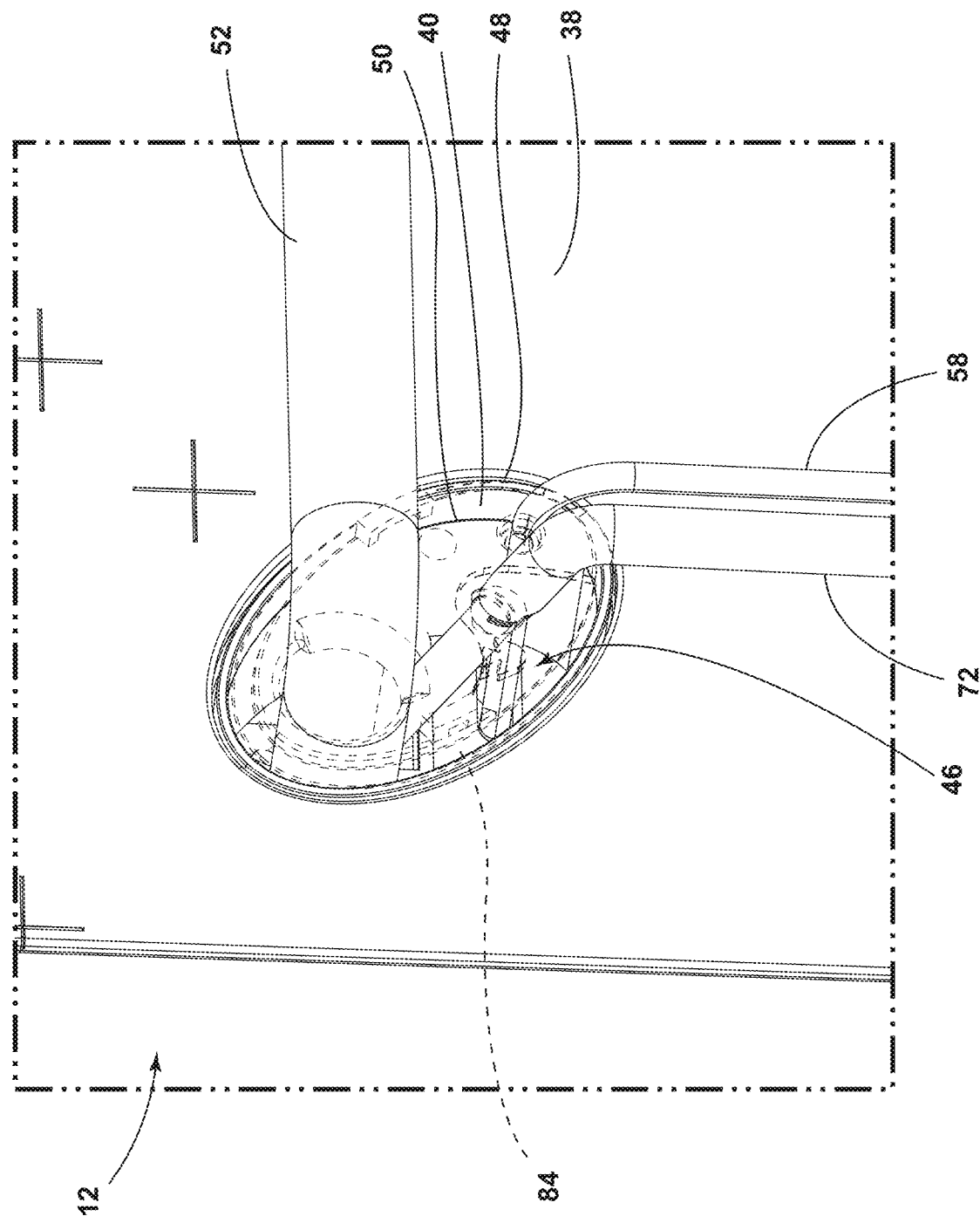
FIG. 7 is a magnified view of area VII of FIG. 6, illustrating the refrigeration appliance further including (i) a grommet sealing the pass-through and (ii) a refrigerant line, a water line, and a drain line extending between the refrigeration compartment and the external environment through grommet.

Referring now to FIGS. 6 and 7, the vacuum-insulated structure 12 includes a pass-through 46. The pass-through 46 provides access from the external environment 16 to the refrigerable compartment 14. More particularly, the pass-through 46 is provided by an outer aperture 48 through the outer wall 38 of the vacuum-insulated structure 12 and an inner aperture 50 through the inner wall 40. The inner aperture 50 and the outer aperture 48 are aligned, which permits the passage of components through the pass-through 46 from the external environment 16 and into the refrigerable compartment 14 as elaborated upon below. In embodiments, such as that illustrated, the pass-through 46 is through the rear wall 28 of the refrigerable compartment 14.

Figure 8:
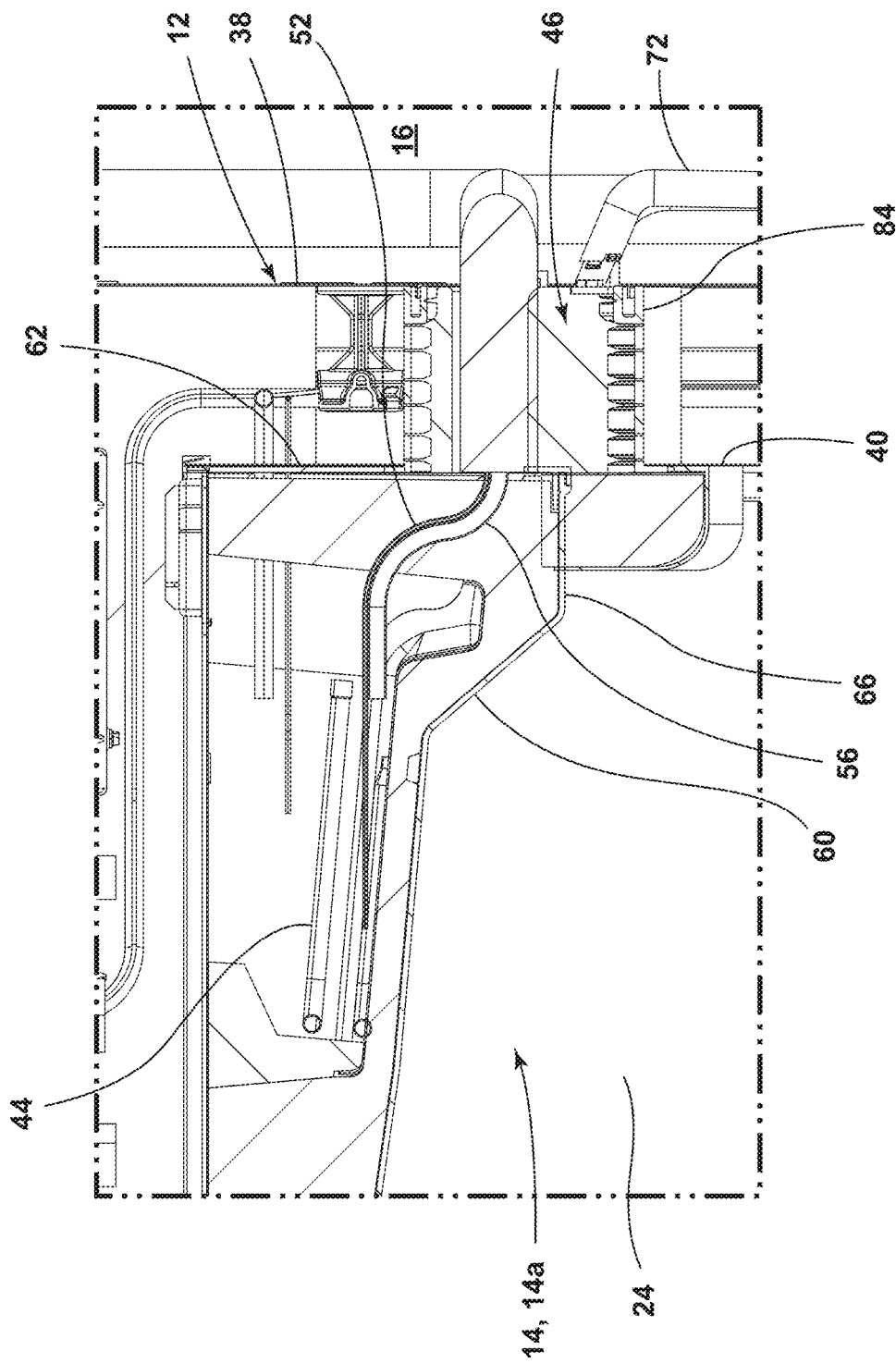
FIG. 8 is an elevational view of a cross-section taken through line VIII-VIII of FIG. 3, illustrating the refrigerant line extending from the external environment, through the pass-through and the grommet, and into the refrigeration compartment to provide fluid communication with the evaporator within the refrigerator compartment.

Referring additionally to FIG. 8, the refrigeration appliance 10 further includes a refrigerant line 52. The refrigerant line 52 extends from the external environment 16, through the pass-through 46, and into the refrigerable compartment 14. The refrigerant line 52 is in fluid communication with the evaporator 44. In use, the refrigerant line 52 carries a refrigerant to and from the evaporator 44. While in the evaporator 44, the refrigerant absorbs heat from the refrigerable compartment 14 and evaporates into a gas. The refrigerant then proceeds through the refrigerant line 52 from the evaporator 44 toward a compressor 54 (see, e.g., FIG. 4). The compressor 54 raises the temperature and pressure of the refrigerant. The refrigerant then passes through a condenser. At the condenser, the refrigerant cools and condenses back into a liquid. The refrigerant, now cooled and in liquid state, is then moved again to the evaporator 44 via the refrigerant line 52 to perform the refrigeration cycle again. In embodiments, the refrigerant line 52 is formed of a metal, such as copper or aluminum. In embodiments, the refrigerant line 52 has a surface 56. In embodiments, in use, the surface 56 of the refrigerant line 52 has a temperature that is less than or equal to 0° C.

Figure 9:
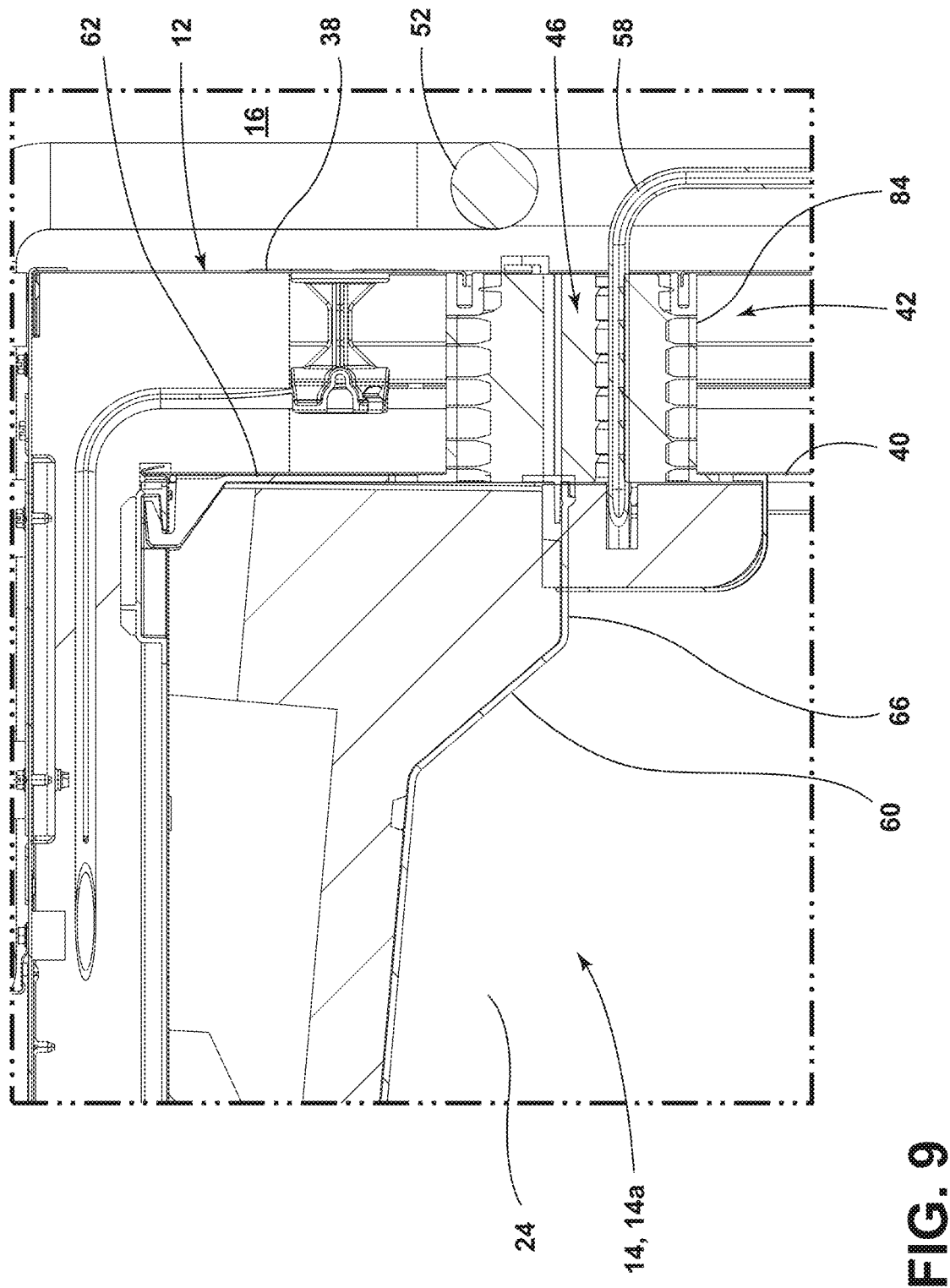
FIG. 9 is an elevational view of a cross-section taken through line IX-IX of FIG. 3, illustrating the water line extending from the external environment, through the pass-through and the grommet, and into the refrigeration compartment.
Figure 10:
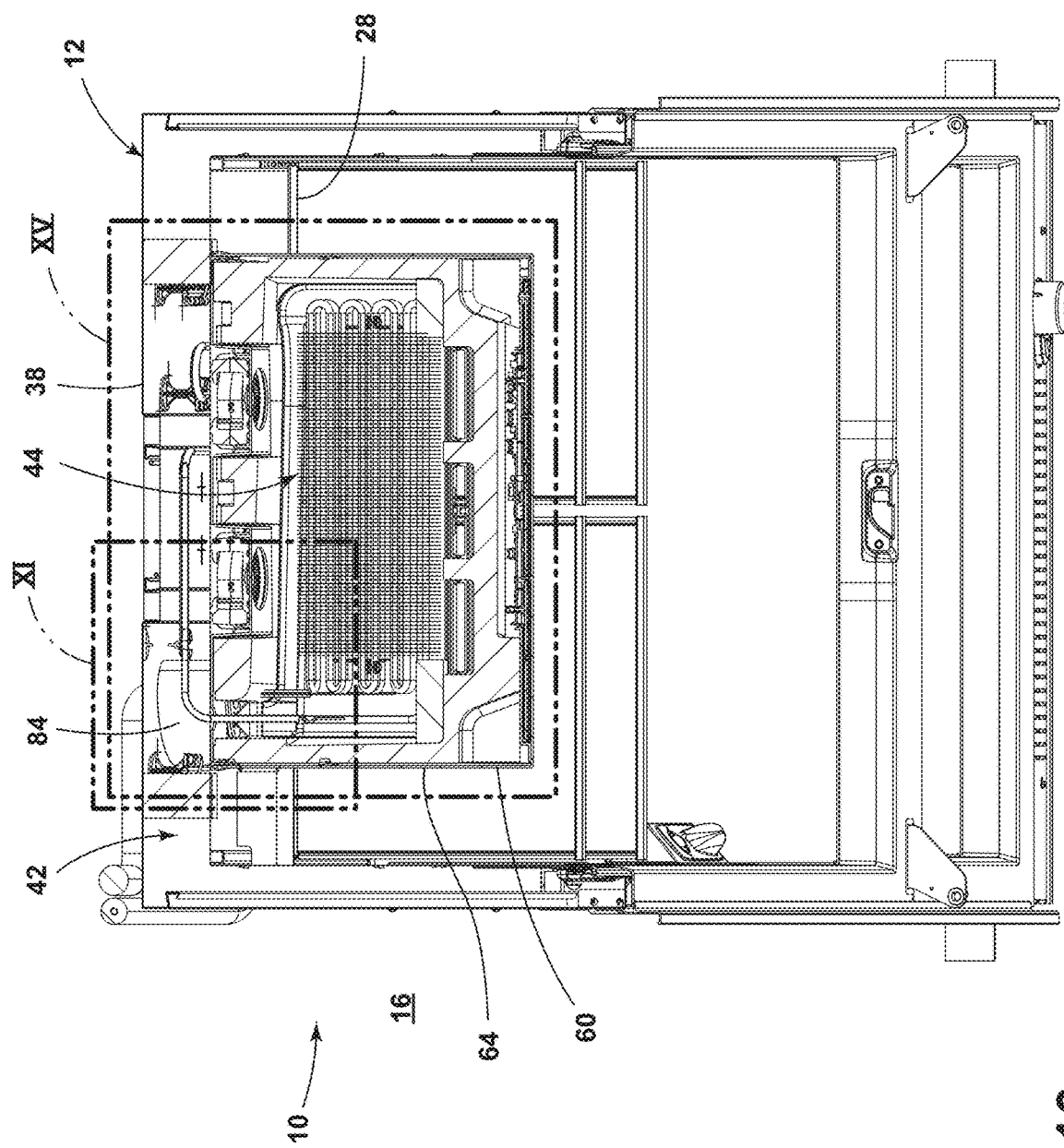
FIG. 10 is an overhead view of a cross-section taken through line X-X of FIG. 3, illustrating a housing that houses the evaporator within the refrigeration compartment.
Figure 11:
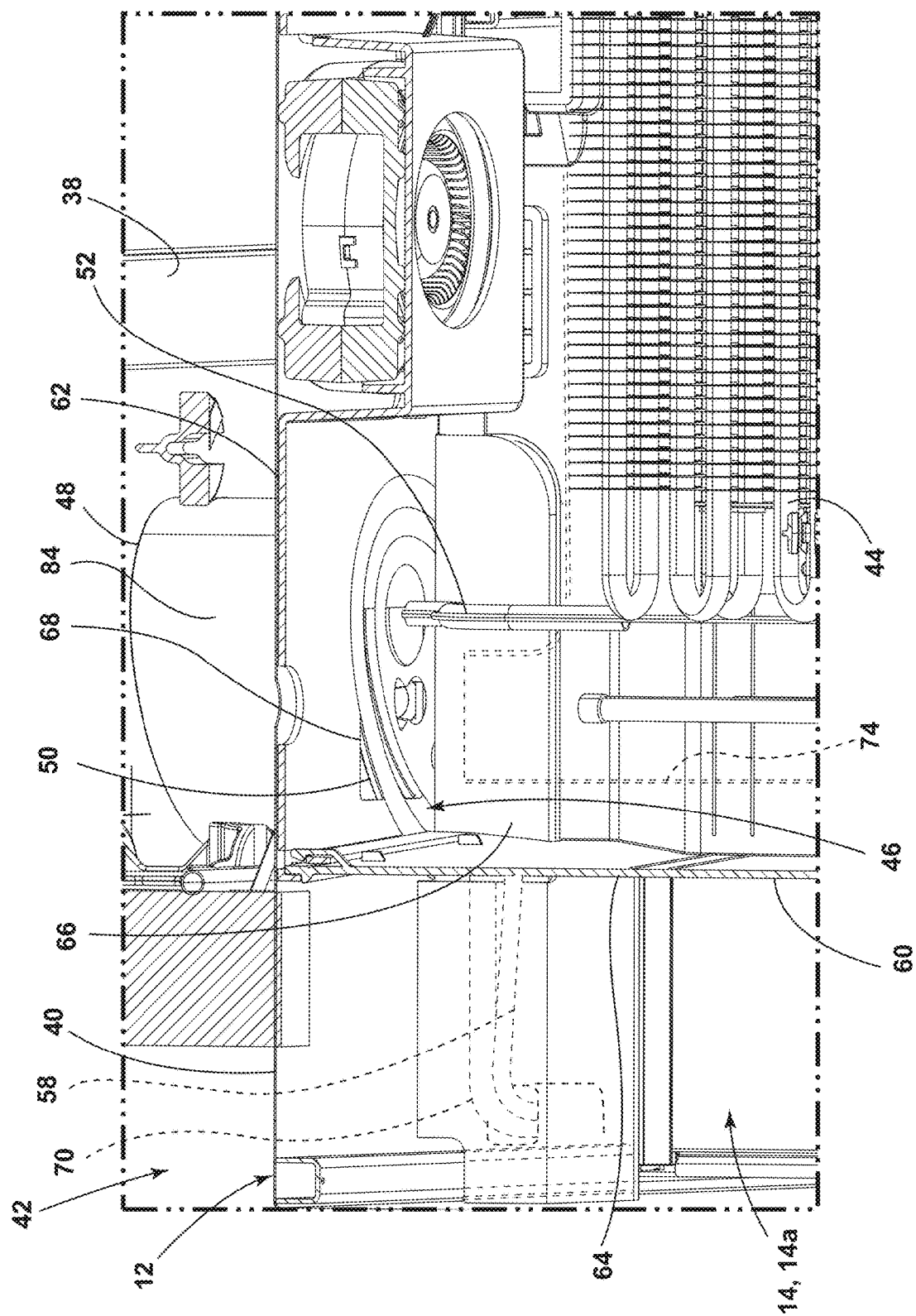
FIG. 11 is a magnified view of area X of FIG. 10, illustrating the housing including a rear wall adjacent the inner wall of the vacuum-insulated structure and an aperture through the rear wall aligned with a portion of the pass-through to permit entry of the refrigerant line into the housing but not the water line.
Figure 12:
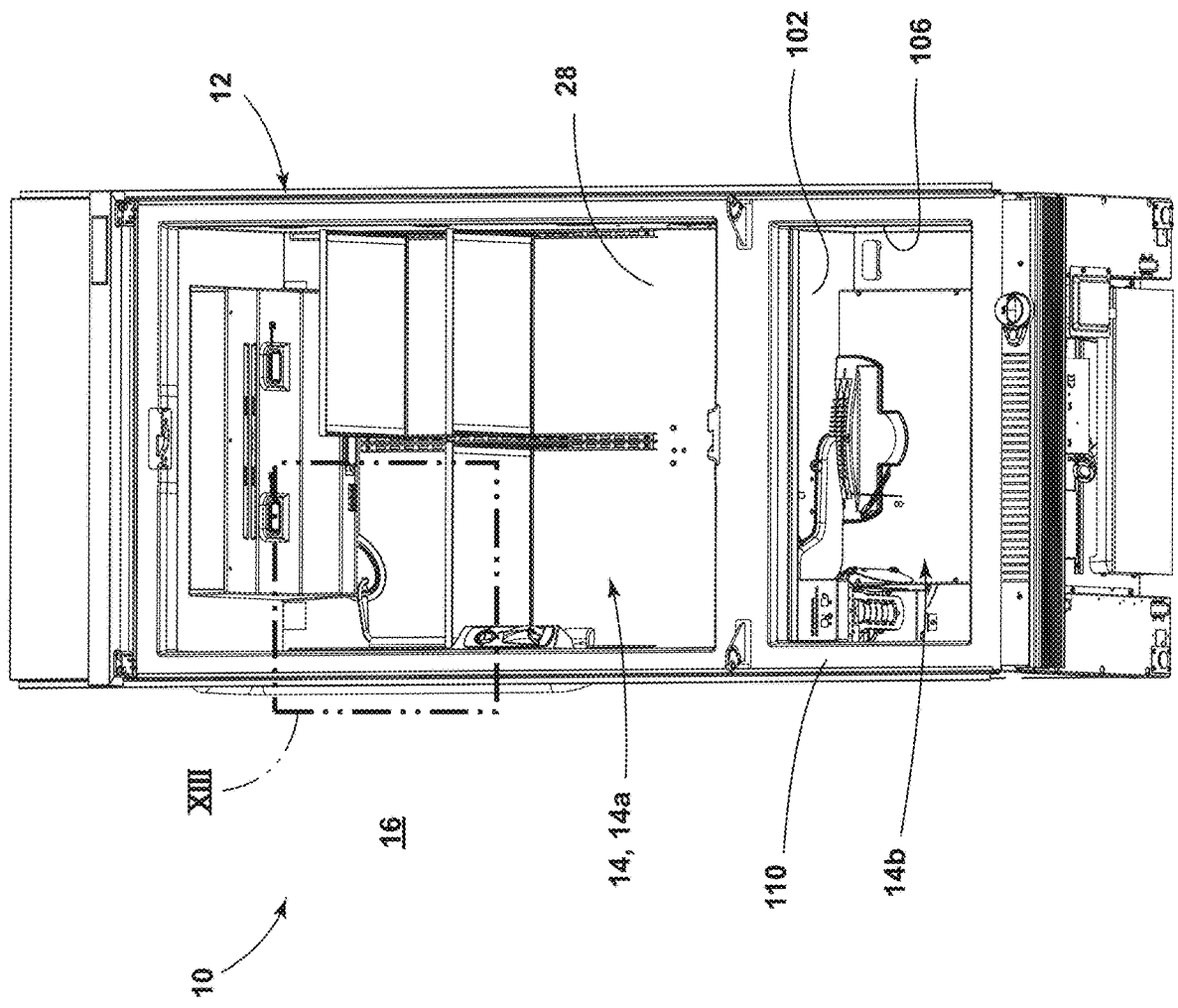
FIG. 12 is a bottom perspective view of the cross-section taken through line X-X of FIG. 3, illustrating the vacuum-insulated structure forming the refrigeration compartment and the freezer compartment.
Figure 13:
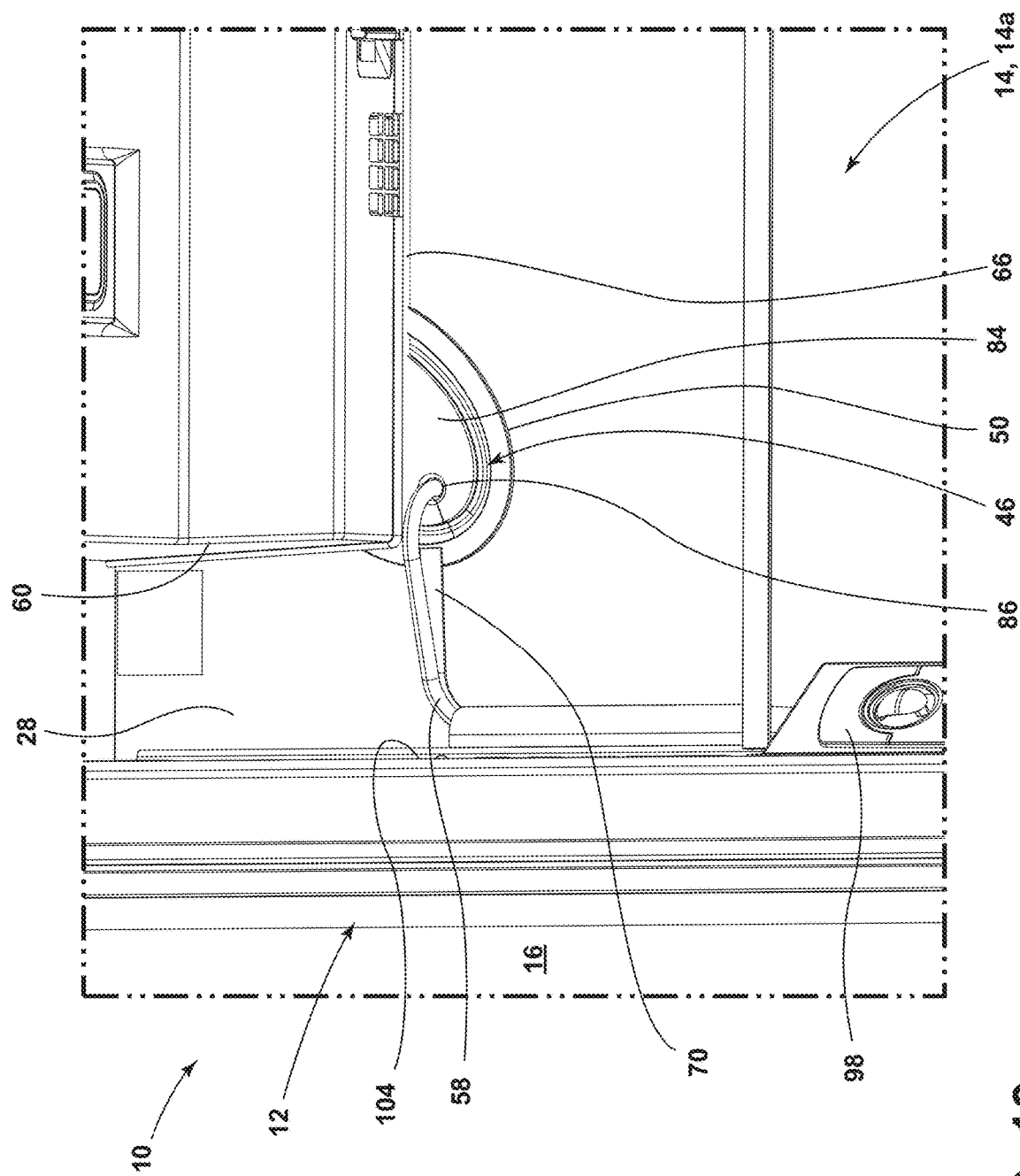
FIG. 13 is a magnified view of area XIII of FIG. 12, illustrating (i) the water line extending from the pass-through and the grommet into the refrigeration compartment outside of the housing that houses the evaporator and the refrigeration line within the refrigeration compartment and (ii) a heater near the water line exiting the pass-through and the grommet.

Referring to FIG. 9, the refrigeration appliance 10 further includes a water line 58. The water line 58 extends from the external environment 16, through the pass-through 46 with the refrigerant line 52, and into the refrigerable compartment 14. The water line 58 within the refrigerable compartment 14 is disposed to the inside of the inner wall 40 of the vacuum-insulated structure 12. In use, the water line 58 carries water from a source (not illustrated) at the external environment 16, through the pass-through 46, and into the refrigerable compartment 14. The water can then be utilized for a variety of purposes, several of which are described below. The water has a temperature above 0° C.

Referring additionally to FIGS. 10-13, the refrigeration appliance 10 further includes a housing 60 for the evaporator 44. The housing 60 at least partially houses the evaporator 44 within the refrigerable compartment 14. In embodiments, such as that illustrated, the housing 60 includes at least a rear wall 62, a sidewall 64, and a floor 66. The rear wall 62 is disposed next to, such as against, the inner wall 40 of the vacuum-insulated structure 12 that provides the rear wall 28 of the refrigerable compartment 14. The floor 66 is also disposed next to, such as against, the inner wall 40 of the vacuum-insulated structure 12 that provides the rear wall 28 of the refrigerable compartment 14, where the floor 66 transitions into the rear wall 62 of the housing 60. The rear wall 62 of the housing 60 can include an aperture 68. The aperture 68 is at least partially aligned with the pass-through 46 and the inner aperture 50 of the inner wall 40. The aperture 68 is positioned so that the refrigerant line 52 but not the water line 58 extends into the housing 60 of the evaporator 44. Further, the floor 66 of the housing 60 is positioned to separate the water line 58 from the refrigerant line 52 where the water line 58 and the refrigerant line 52 extend from the pass-through 46 and into the refrigerable compartment 14. In embodiments, such as that illustrated, the floor 66 of the housing 60 is positioned to place the refrigerant line 52 in the housing 60 above the floor 66 and the water line 58 out of the housing 60 below the floor 66.

With the housing 60 of the evaporator 44 separating the water line 58 from the refrigerant line 52, the refrigerant line 52 is less able to extract sufficient heat from the water line 58 to cause water within the water line 58 to freeze. The housing 60 hinders the transfer of thermal energy from the water within the water line 58 to the refrigerant line 52. The water within the water line 58 is thus less likely to freeze.

Referring back to FIGS. 11 and 13, in embodiments, the refrigeration appliance 10 further includes a heater 70. The heater 70 is disposed proximate the water line 58 near where the water line 58 enters the refrigerable compartment 14 from the pass-through 46. For example, the heater 70 can be disposed a distance of about 5 cm or less from the water line 58 entering the refrigerable compartment 14 from the pass-through 46. In any event, the heater 70 is positioned relative to the water line 58 to impart sufficient heat to the water within the water line 58 to prevent the water from freezing or to thaw water that has frozen. The heater 70 can be a resistive heating element or a thermoelectric element, among other options.

Figure 14:
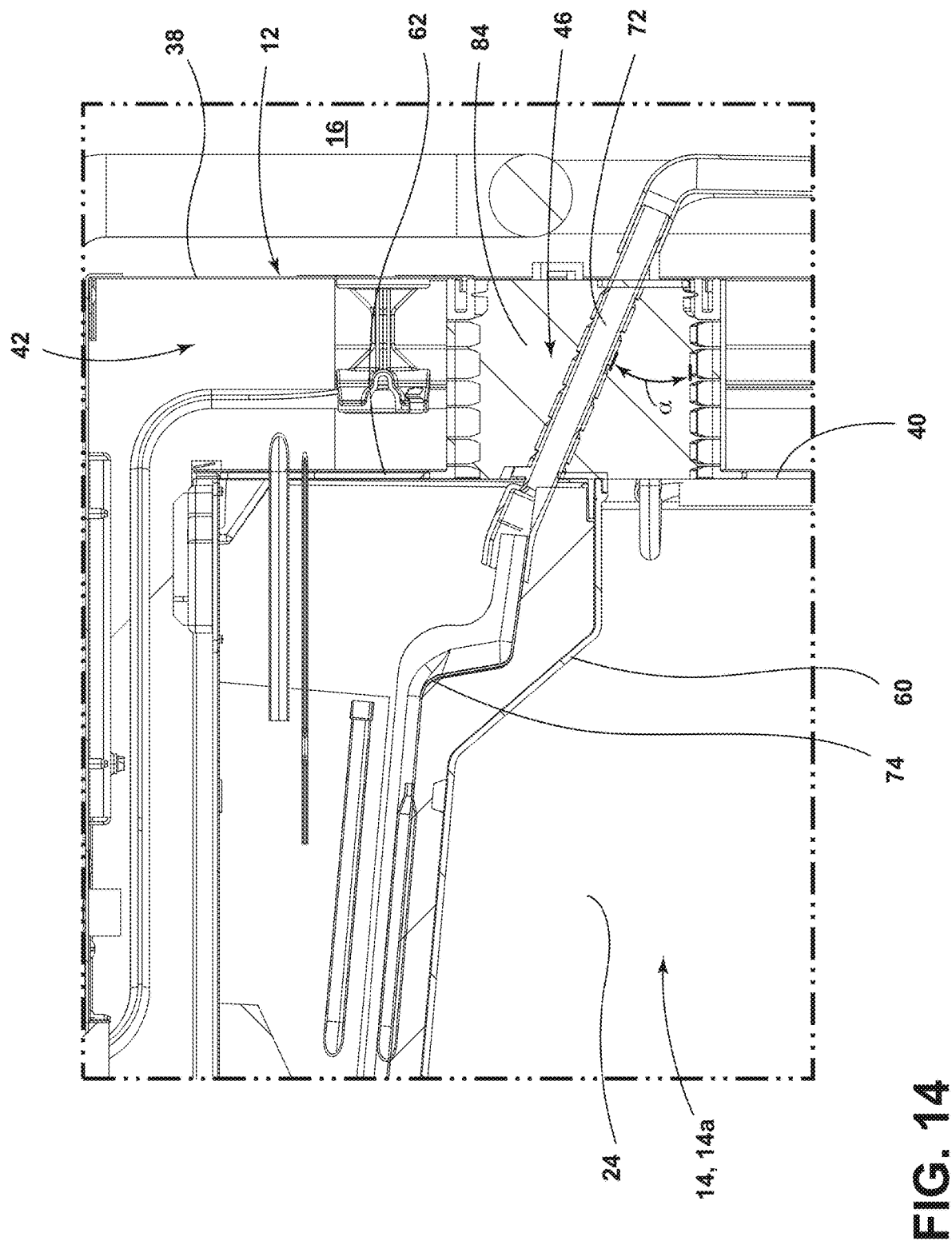
FIG. 14 is a cross-sectional view taken through line XIV-XIV of FIG. 3, illustrating the drain line extending from a drip pan under the evaporator within the refrigeration compartment, rearward and downward through the pass-through and the grommet, and into the external environment to expel condensed water from the evaporator from the refrigerator compartment.
Figure 15:
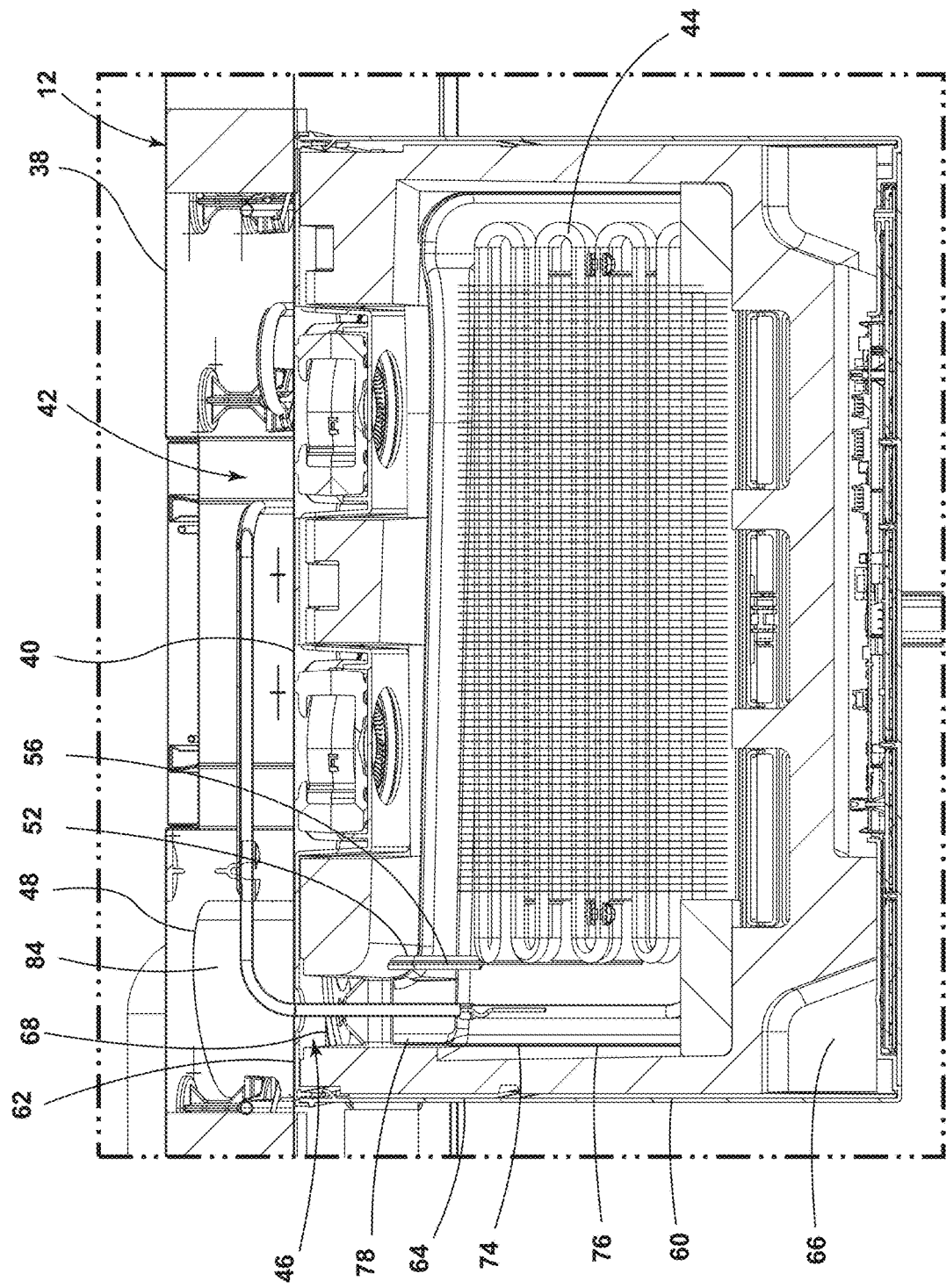
FIG. 15 is an overhead perspective magnified view of area XV of FIG. 10, illustrating the drip pan under the evaporator within the refrigeration compartment and the drip pan having a funnel that funnels collected water to the drain line within housing for the evaporator.

Referring now additional to FIGS. 14 and 15, in embodiments, the refrigeration appliance 10 further includes a drain line 72. The drain line 72 extends through the pass-through 46, along with the water line 58 and the refrigerant line 52. The drain line 72 is configured and positioned to drain away condensate that forms upon the evaporator 44. For example, the refrigeration appliance 10 can further include a drip tray 74. The drip tray 74 is disposed below the evaporator 44. The drip tray 74 has a perimeter 76 sufficiently large to encompass the footprint of the evaporator 44. In use, water condenses upon the evaporator 44, drops of water form on the evaporator 44, and the force of gravity causes the drops of water to fall from the evaporator 44 and onto the drip tray 74. The drip tray 74 has a funnel 78 and a contour that directs the water thereupon to the funnel 78. The funnel 78 is in fluid communication with the drain line 72 near the pass-through 46. Water in the funnel 78 flows from the funnel 78 and into the drain line 72. The drain line 72 extends from the funnel 78 rearward 80 and downward 82 through the pass-through 46 at an angle α relative to horizontal that is within a range of from greater than 0 degrees to 90 degrees, such as within a range of from 30 degrees to 45 degrees.

Figure 16:
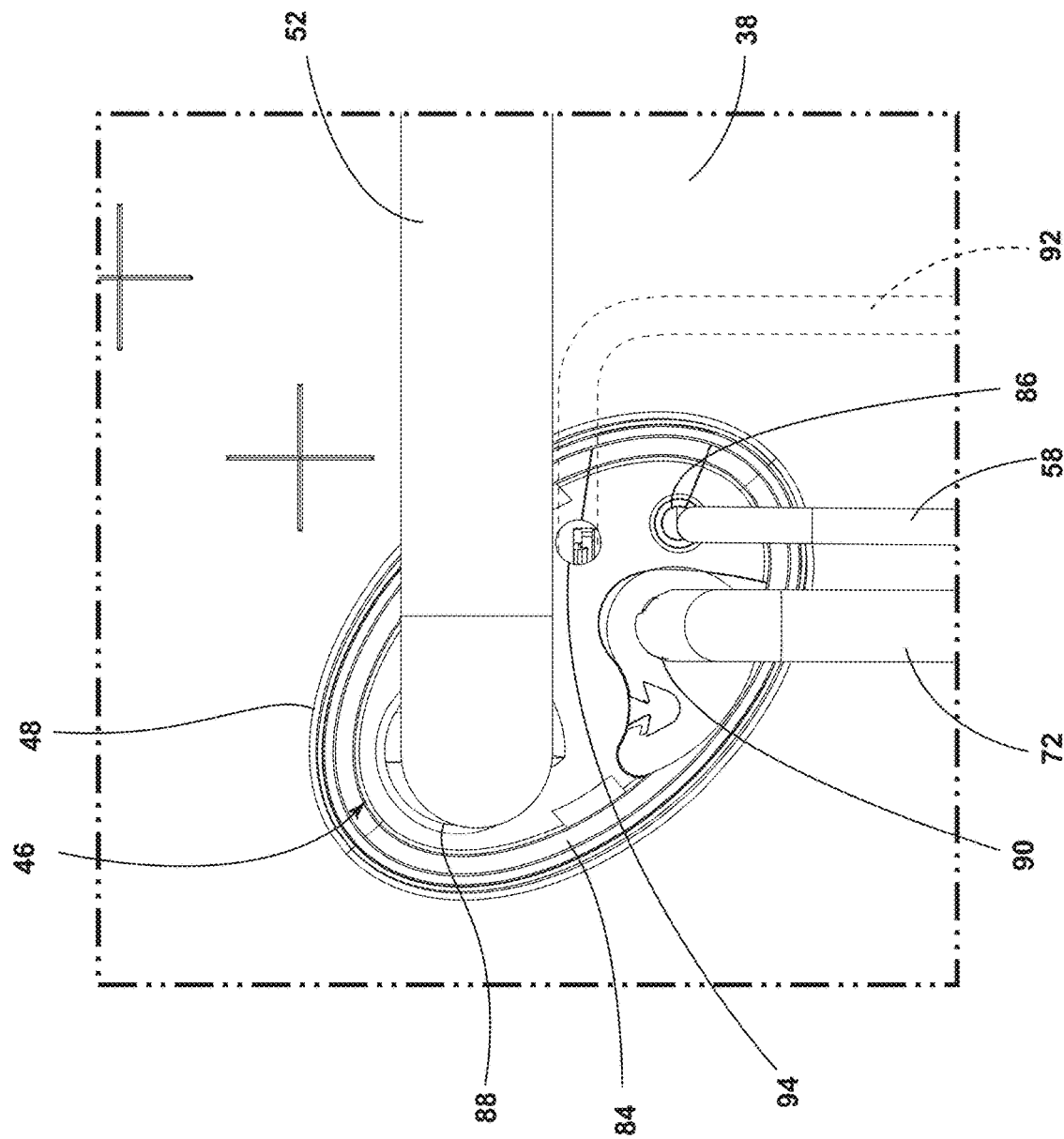
FIG. 16 is an elevational view of area XVI of FIG. 6, illustrating the refrigerant line, the drain line, the water line, and electrical wires entering into the pass-through from the external environment to the refrigerator compartment via dedicated apertures through the grommet.

Referring back to FIG. 7 and additionally FIG. 16, in embodiments, the refrigerant line 52 and the water line 58 are relatively spaced apart through the pass-through 46. Spacing the refrigerant line 52 and the water line 58 apart reduces the ability of the refrigerant line 52 to withdraw heat from water in the water line 58 and cause the water to solidify into ice. In some instances, the drain line 72 is disposed between the refrigerant line 52 and the water line 58. So positioning the drain line 72 shields the water line 58 from the refrigerant line 52. Because water will periodically flow through the drain line 72 at a temperature above 0° C., the refrigerant line 52 can withdraw heat from the water in the drain line 72, and the cooled water in the drain line 72 flows downward and away. Heat that is withdrawn from the water in the drain line 72 is heat that is not withdrawn from water in the water line 58, thus reducing the likelihood that the water in the water line 58 would freeze. The water in the water line 58 may be in position for a period of time until the water is used or dispensed, while the water in the drain line 72 continuously or occasionally drains. Further, to the extent that the water in the drain line 72 has a temperature that is higher than a temperature of the water in the water line 58, the water in the water line 58 can extract heat from the water in the drain line 72, thus decreasing the likelihood that the water in the water line 58 would freeze. In some instances, such as that illustrated, the refrigerant line 52 is disposed closer to the drain line 72 than to the water line 58 within the pass-through 46.

Figure 17:
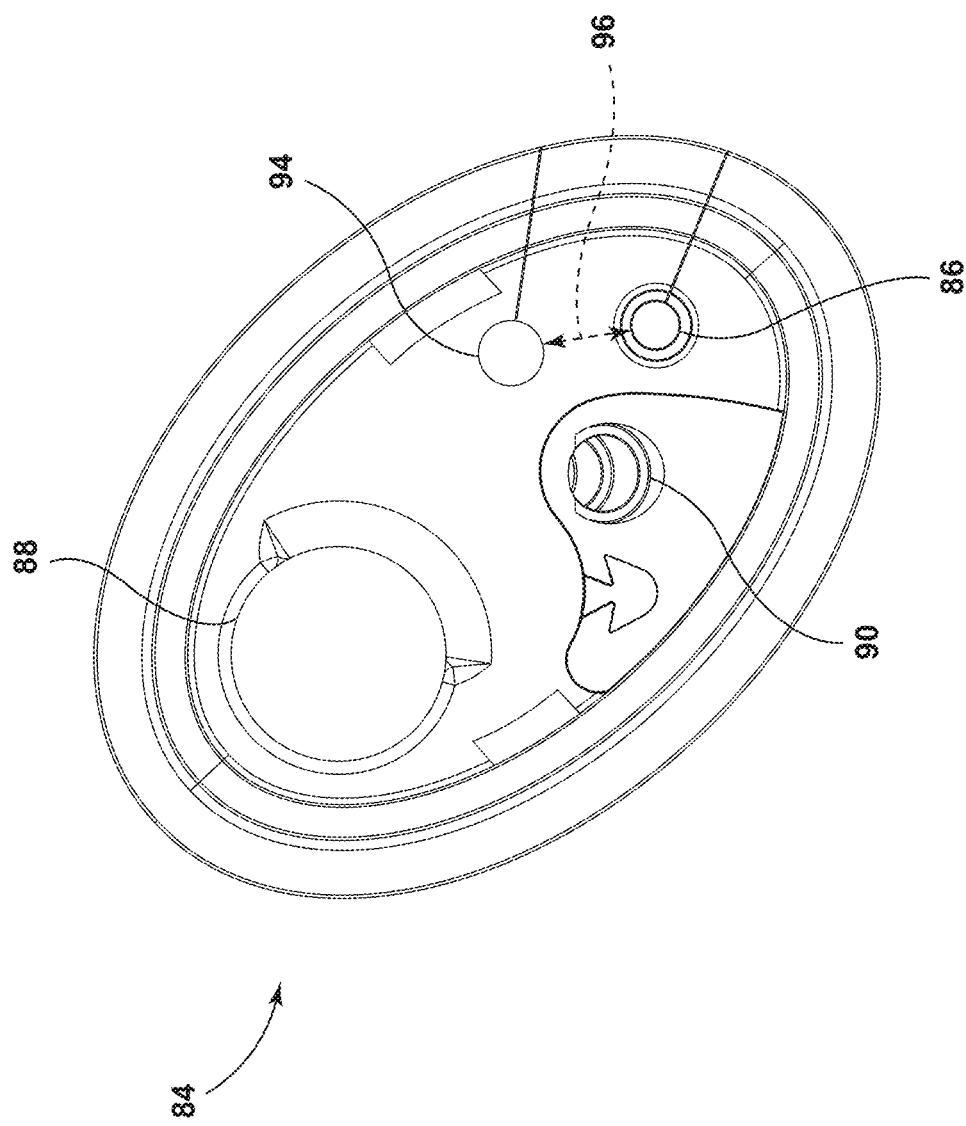
FIG. 17 is an elevational view of the grommet set within the pass-through through the vacuum-insulated structure into the refrigerator compartment.
Figure 18:
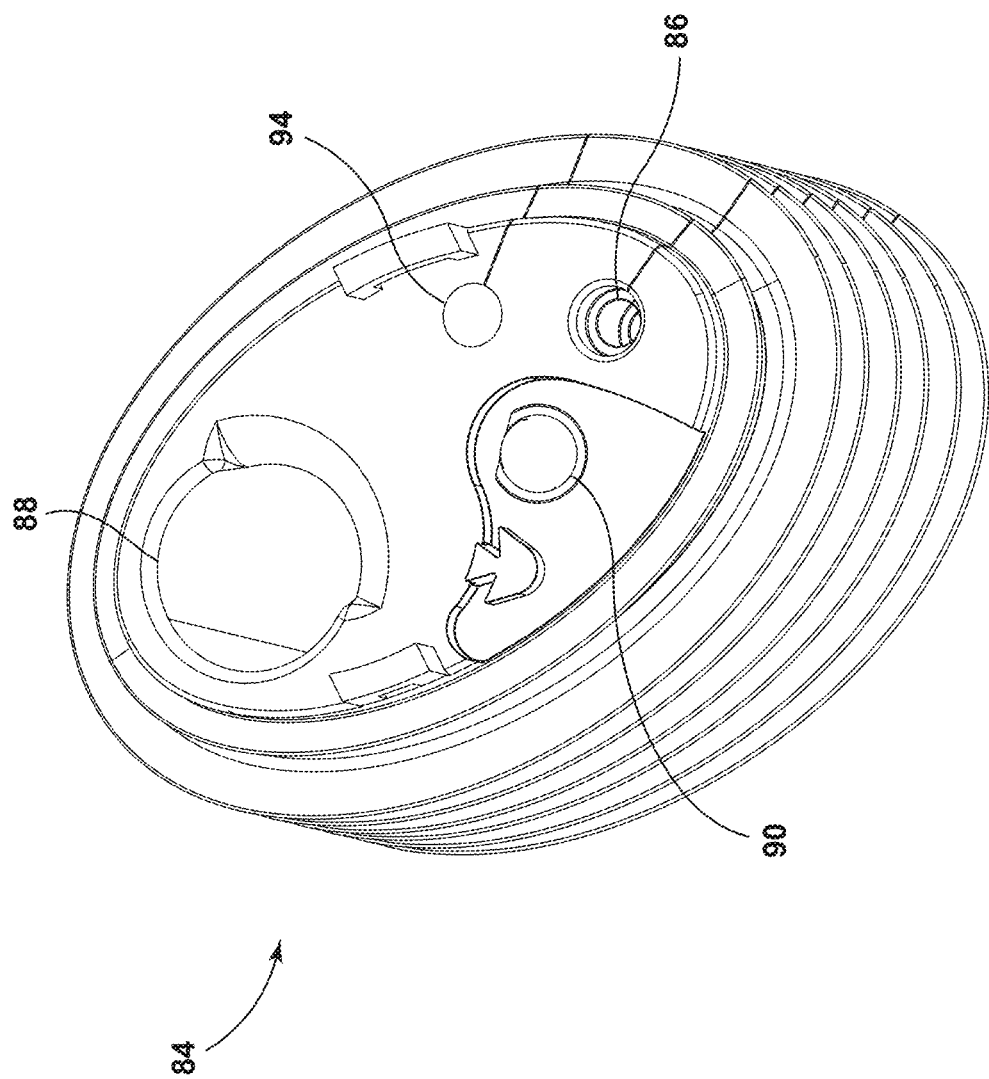
FIG. 18 is a perspective view of the grommet.

Referring additionally to FIGS. 17 and 18, in embodiments, the refrigeration appliance 10 further includes a grommet 84 disposed within the pass-through 46. The grommet 84 can help maintain an air-tight seal within the vacuum-insulated structure 12 about the pass-through 46. The grommet 84 can have a rubber or elastomeric composition and be slightly oversized relative to the inner aperture 50 through the inner wall 40 and the outer aperture 48 through the outer wall 38 that form the pass-through 46 through the vacuum-insulated structure 12. The water line 58, the refrigerant line 52, and the drain line 72, if present, extend through the grommet 84. The grommet 84 forms an air-tight seal around the water line 58, refrigerant line 52, and, if present, the drain line 72, and, if present. For example, the grommet 84 includes an aperture 86 through which the water line 58 extends, an aperture 88 through which the refrigerant line 52 extends, and an aperture 90 through which the drain line 72 if present extends. The apertures 86-90 are sized slightly smaller than the outer diameters of the water line 58, refrigerant line 52, and the drain line 72, respectively. The air-tight fitting of the grommet 84 around the refrigerant line 52, the water line 58, and the drain line 72 helps limit heat transfer between the external environment 16 and the refrigerable compartment 14 through the apertures 86-90.

Referring back to FIGS. 11 and 13, in embodiments, the housing 60 of the evaporator 44 contacts the grommet 84 within the refrigerable compartment 14. For example, the rear wall 62 of the housing 60 can contact the grommet 84. Further, the floor 66 of the housing 60 can contact the grommet 84. The housing 60 contacting the grommet 84 reduces convection between the refrigerant line 52 and the water line 58, thus reducing the transfer of heat from the water line 58 to the refrigerant line 52.

Referring back to FIG. 8, for example, the pass-through 46 and the grommet 84 are disposed elevationally below the evaporator 44. Positioning the pass-through 46 and the grommet 84 elevationally below the evaporator 44 allows the drain line 72 to extend at the angle α rearward 80 and downward 82 through the apertures of the grommet 84. The water condensing upon evaporator 44 can thus flow via the force of gravity rearward 80 and downward 82 through the pass-through 46 via the drain line 72.

Referring back to FIGS. 16-18, in embodiments, the refrigeration appliance 10 further includes one or more electrical wires 92 extending through the pass-through 46, such as through the grommet 84. The one or more electrical wires 92 can be a component of a wire harness extending through the pass-through 46 and the grommet 84. To accommodate the one or more electrical wires 92, the grommet 84 can include an aperture 94 in addition to the apertures 86-90. The aperture 94 of the grommet 84 through which the one or more electrical wires 92 extend, in some instances, is disposed a distance 96 of greater than or equal to 5 cm away from the aperture 86 of the grommet 84 through which the water line 58 extends. In some instances, the one or more electrical wires 92 are disposed the distance 96 of greater than or equal to 5 cm away from the water line 58 while extending through the grommet 84 and the pass-through 46.

Thus far, the refrigerable compartment 14 of the refrigeration appliance 10 has been described, and has been described in the context of the refrigerator compartment 14a of the refrigeration appliance 10 that additionally includes the freezer compartment 14b. The pass-through 46 into the refrigerable compartment 14 as described is thus a refrigerator pass-through 46 in the context of the refrigerator compartment 14a, the evaporator 44 within the refrigerable compartment 14 as described is thus a refrigerator evaporator 44 in the context of the refrigerator compartment 14a, the refrigerant line 52 as described is thus a refrigerator refrigerant line 52 in the context of the refrigerator compartment 14a, as so on.

Figure 19:
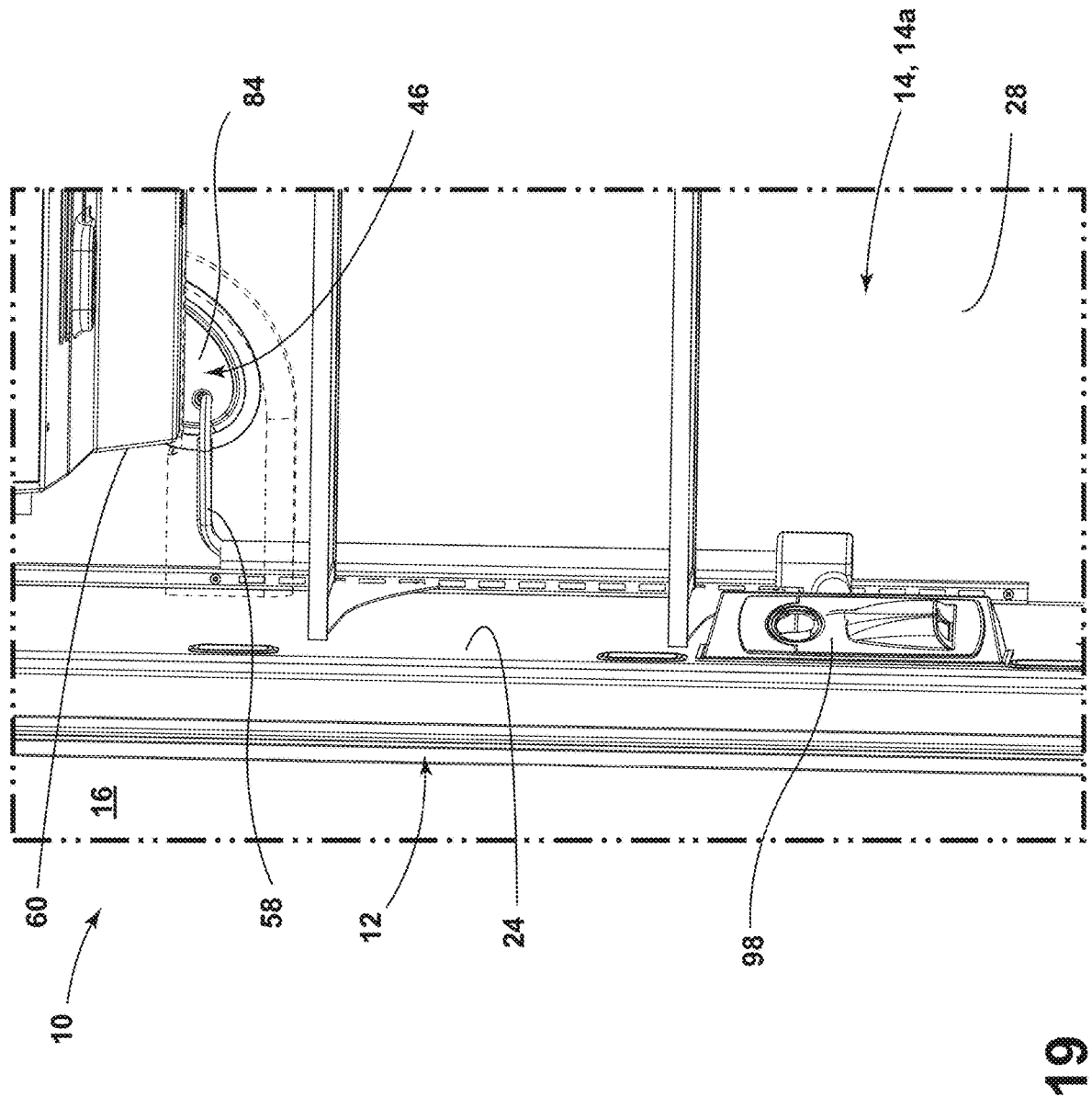
FIG. 19 is a magnified view of area XIX of FIG. 3, illustrating the water line in the refrigerator compartment extending from the grommet outside of the housing for the evaporator and along the rear wall and a side wall of the refrigeration compartment to a water dispenser in order to provide water that can be dispensed via the water dispenser.

Referring additionally to FIG. 19, in embodiments, the refrigerator compartment 14a further includes a water dispenser 98 disposed within the refrigerator compartment 14a. As mentioned, the water line 58 extends through the pass-through 46 and into the refrigerator compartment 14a. The water line 58 can then, as in the illustrated embodiments, extend to the water dispenser 98 and is in liquid communication with the water dispenser 98. In use, water travels through the water line 58 from the source of water external to the refrigeration appliance 10, into the water line 58, and into the water dispenser 98. A user can then command the water dispenser 98 to dispense water into a container, such as a bottle. The water line 58 can extend along the rear wall 28 of the refrigerator compartment 14a, and then the sidewall 24, from the pass-through 46 and grommet 84 to the dispenser 98. The water dispenser 98 can be disposed at the sidewall 24 of the refrigerator compartment 14a near the opening 30 thereto.

As mentioned, the refrigeration appliance 10 in embodiments further includes the freezer compartment 14b as another refrigerable compartment 14 that the vacuum-insulated structure 12 defines. Referring back to FIGS. 3 and 4, the freezer compartment 14b includes a floor 100, a ceiling 102 opposing the floor 100, a sidewall 104, a sidewall 106 opposing the sidewall 104, and a rear wall 108. The freezer compartment 14b has an opening 110 thereto. The rear wall 108 is disposed rearward 80 of the opening 110.

Figure 20:
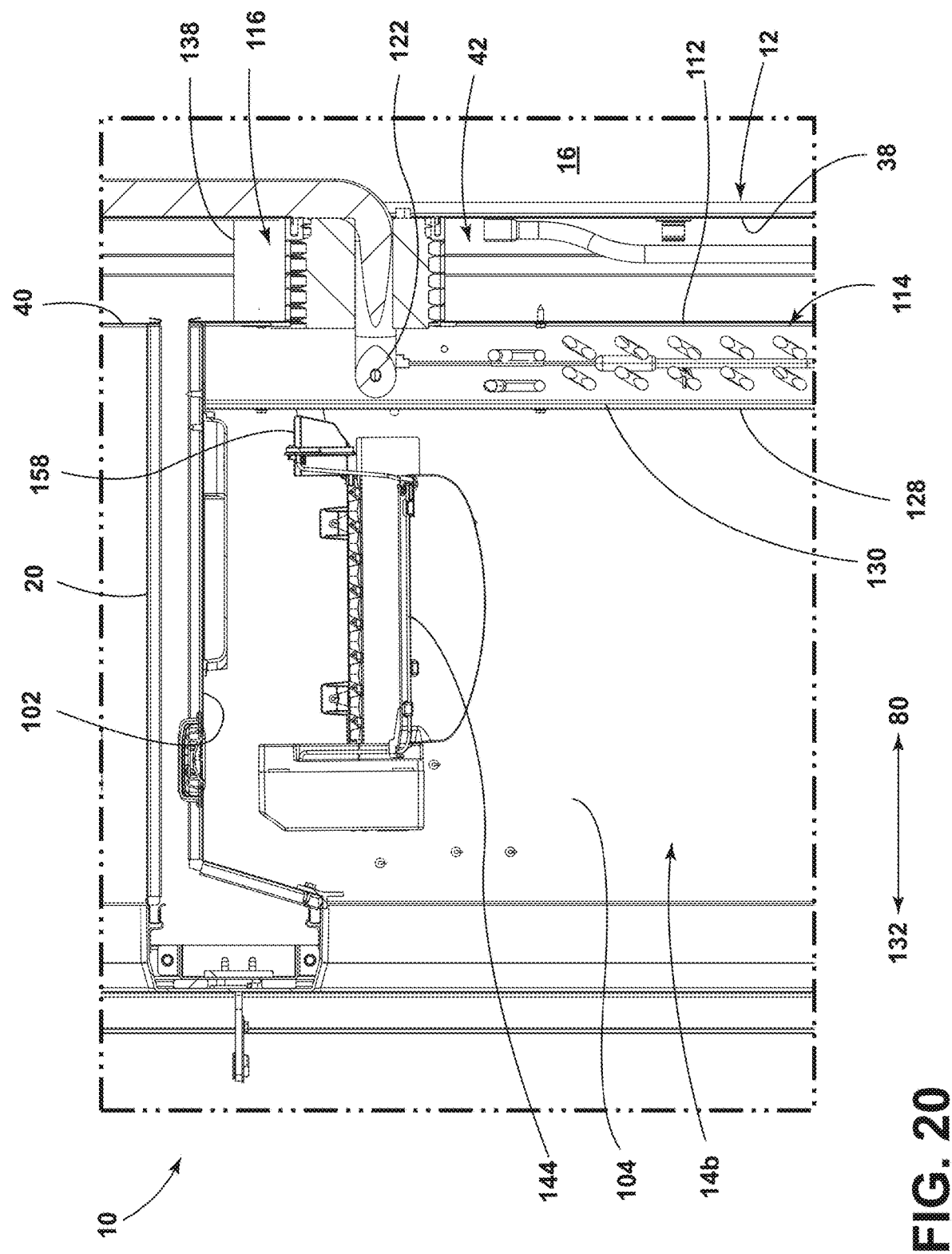
FIG. 20 is a cross-sectional view take through line XX-XX of FIG. 3, illustrating (i) the vacuum-insulated structure further including a freezer inner wall defining the freezer compartment that is separated from the inner wall defining the refrigerator compartment and the outer wall by the space maintained at reduced pressure and (ii) a freezer evaporator within the freezer compartment.

Referring additionally to FIG. 20, the vacuum-insulated structure 12, in addition to the outer wall 38 and the inner wall 40, includes a freezer inner wall 112. The outer wall 38 faces the freezer inner wall 112. The space 42 continues between the outer wall 38 and the freezer inner wall 112. The freezer inner wall 112 provides the floor 100, the sidewalls 104, 106, the rear wall 108, and the ceiling 102 of the freezer compartment 14b. The inner wall 40 forming the refrigeration compartment 14a and the freezer inner wall 112 forming the freezer compartment 14b are placed next to each other with the space 42 separating the inner wall 40 and the freezer inner wall 112. In embodiments, such as that illustrated, the inner wall 40 is disposed above the freezer inner wall 112. The outer wall 38 at least partially envelopes both the inner wall 40 and the freezer inner wall 112.

In embodiments, the refrigeration appliance 10 further includes a freezer evaporator 114. The freezer evaporator 114 is disposed within the freezer compartment 14b. The freezer evaporator 114 is disposed to the inside of the freezer inner wall 112 of the vacuum-insulated structure 12. In use, the freezer evaporator 114 lowers and maintains a temperature of the freezer compartment 14b to below ambient temperature, such as less than or equal to 0° C. In embodiments, such as that illustrated, the freezer evaporator 114 is oriented vertically along the freezer inner wall 112 forward 132 of the rear wall 108 of the freezer compartment 14b.

Figure 21:
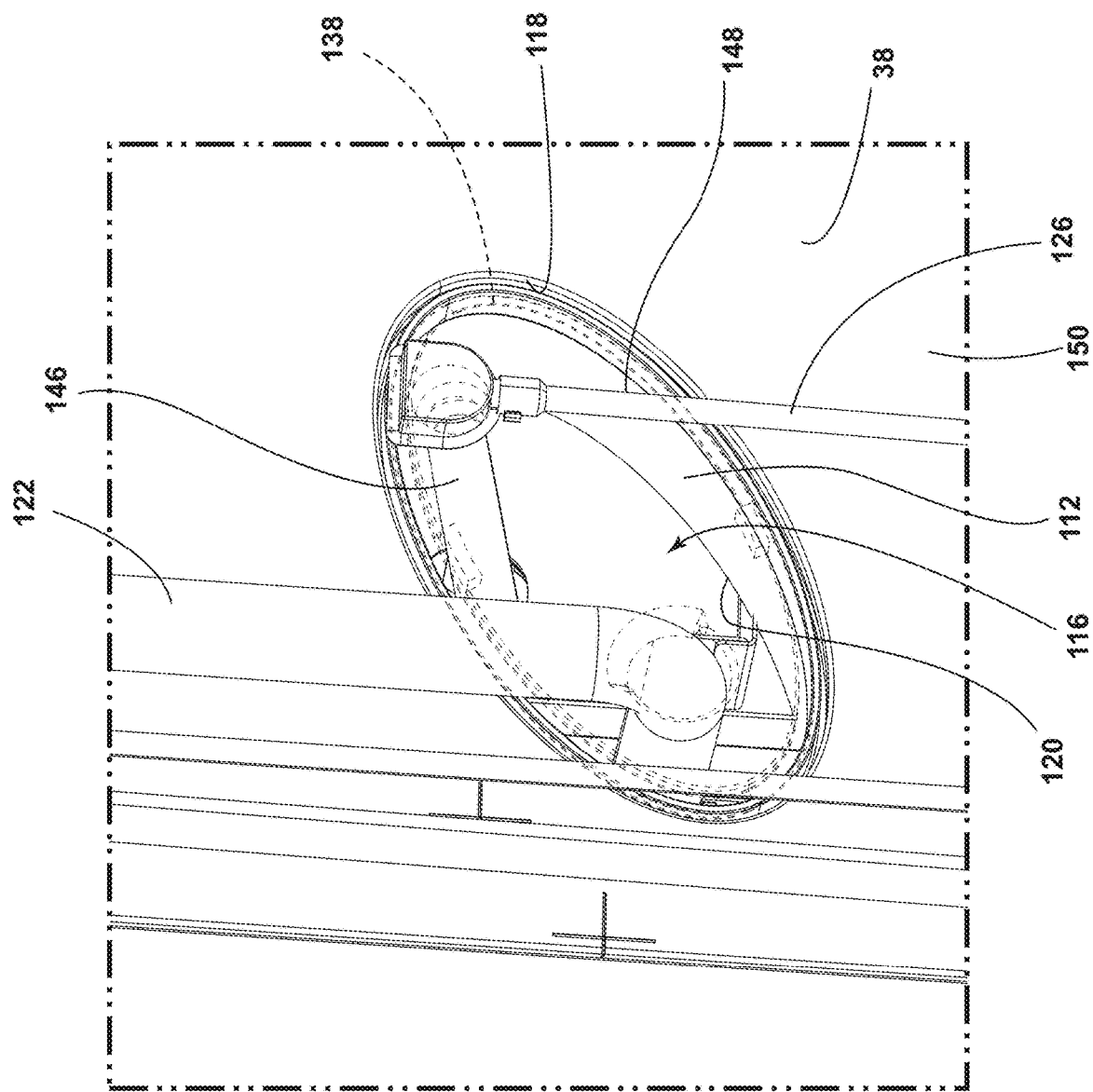
FIG. 21 is a magnified view of area XXI of FIG. 6, illustrating a freezer pass-through and a freezer grommet through which a freezer refrigerant line and a freezer water line extend from the external environment, through the vacuum-insulated structure, and into the freezer compartment.

Referring back to FIG. 6 and additionally to FIG. 21, the vacuum-insulated structure 12 includes a freezer pass-through 116. The freezer pass-through 116 provides access from the external environment 16 to the freezer compartment 14b. More particularly, the freezer pass-through 116 is provided by a second outer aperture 118 through the outer wall 38 of the vacuum-insulated structure 12 and an inner aperture 120 through the freezer inner wall 112. The inner aperture 120 of the freezer inner wall 112 and the second outer aperture 118 are aligned, which permits the passage of components through the freezer pass-through 116 from the external environment 16 and into the freezer compartment 14b as elaborated upon below. In embodiments, the freezer pass-through 116 is through the rear wall 108 of the freezer compartment 14b.

Figure 22:
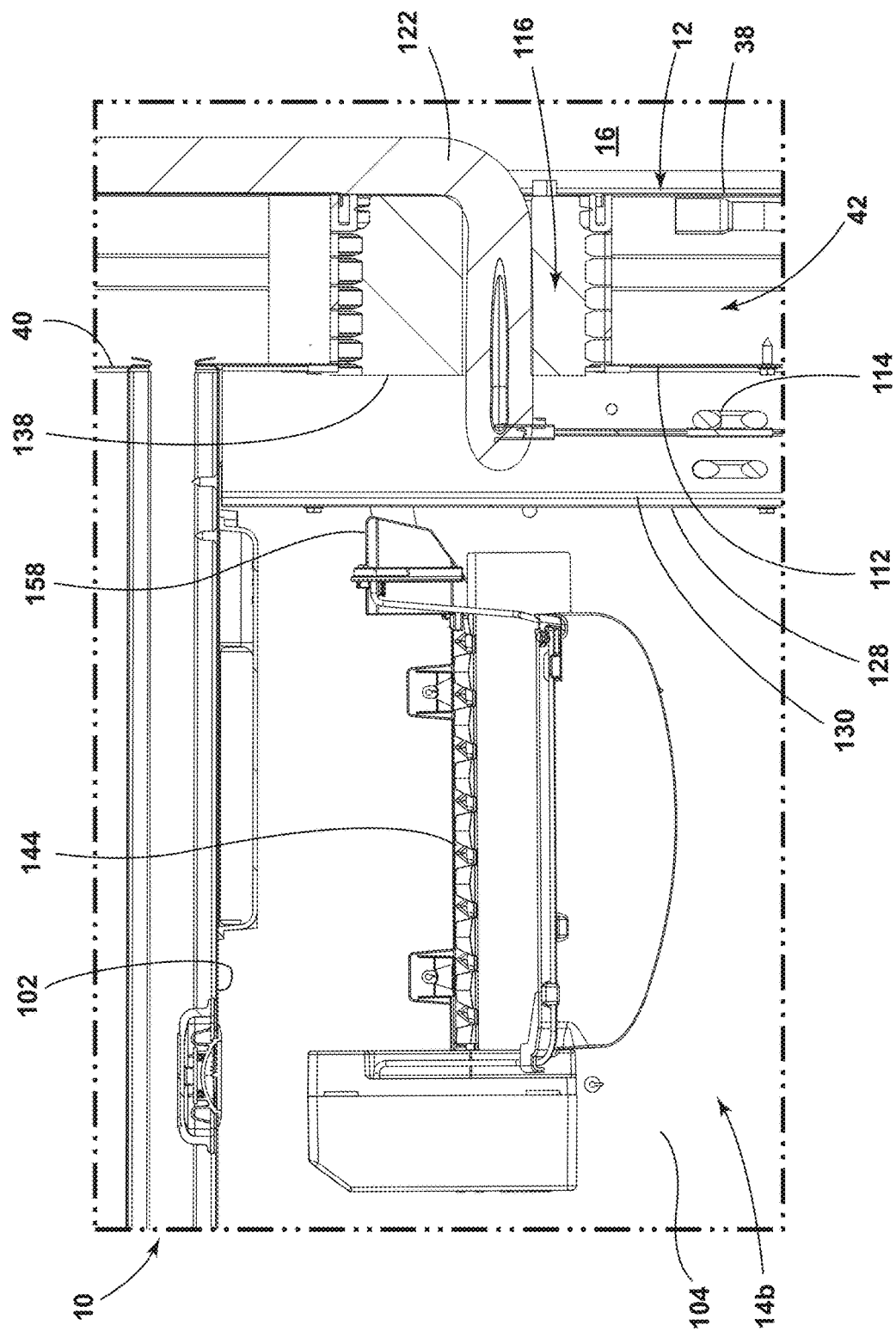
FIG. 22 is a cross-sectional view taken through the line XXII-XXII of FIG. 3, illustrating the freezer refrigerant line extending from the external environment, through the freezer pass-through and the freezer grommet, and into the freezer compartment to provide refrigerant communication with the freezer evaporator within the freezer compartment.

Referring additionally to FIG. 22, in embodiments, the refrigeration appliance 10 further includes a freezer refrigerant line 122. The freezer refrigerant line 122 extends from the external environment 16, through the freezer pass-through 116, and into the freezer compartment 14b. The freezer refrigerant line 122 is in fluid communication with the freezer evaporator 114. In use, the freezer refrigerant line 122 carries the refrigerant to and from the freezer evaporator 114. While in the freezer evaporator 114, the refrigerant absorbs heat from the freezer compartment 14b and evaporates into a gas. The refrigerant the proceeds through the freezer refrigerant line 122 from the freezer evaporator 114 toward the compressor 54. At the condenser, the refrigerant cools and condenses back into a liquid. The refrigerant, now cooled and in liquid state, is then moved again to the freezer evaporator 114 via the freezer refrigerant line 122 to perform the refrigeration cycle again. In embodiments, the freezer refrigerant line 122 has a surface 124 (see FIG. 26). In embodiments, in use, the surface 124 of the freezer refrigerant line 122 has a temperature that is less than or equal to 0° C.

Figure 23:
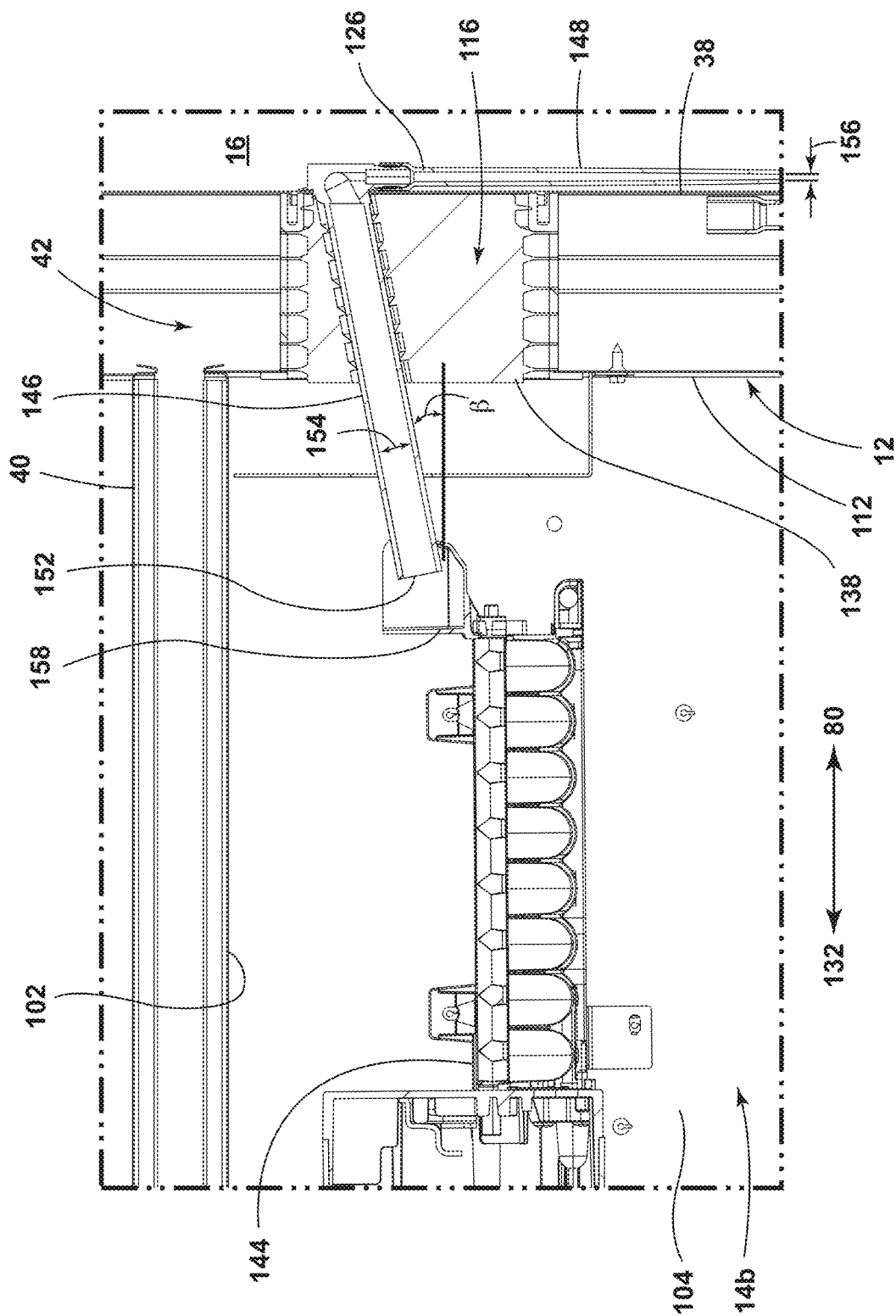
FIG. 23 is a cross-sectional view taken through line XXIII-XXIII of FIG. 3, illustrating the freezer water line including a conduit portion that extends from the external portion, through the freezer pass-through and the freezer grommet, and into the freezer compartment to provide water to an ice-maker within the freezer compartment.

Referring additionally to FIG. 23, the refrigeration appliance 10 further includes a freezer water line 126. The freezer water line 126 extends from the external environment 16, through the freezer pass-through 116 with the freezer refrigerant line 122, and into the freezer compartment 14b. The freezer water line 126 within the refrigerable compartment 14 is disposed to the inside of the freezer inner wall 112 of the vacuum-insulated structure 12. In use, the freezer water line 126 carries water from the source (not illustrated) at the external environment 16, through the freezer pass-through 116, and into the freezer compartment 14b. The water can then be utilized as further described below. The water has a temperature above 0° C.

Figure 24:
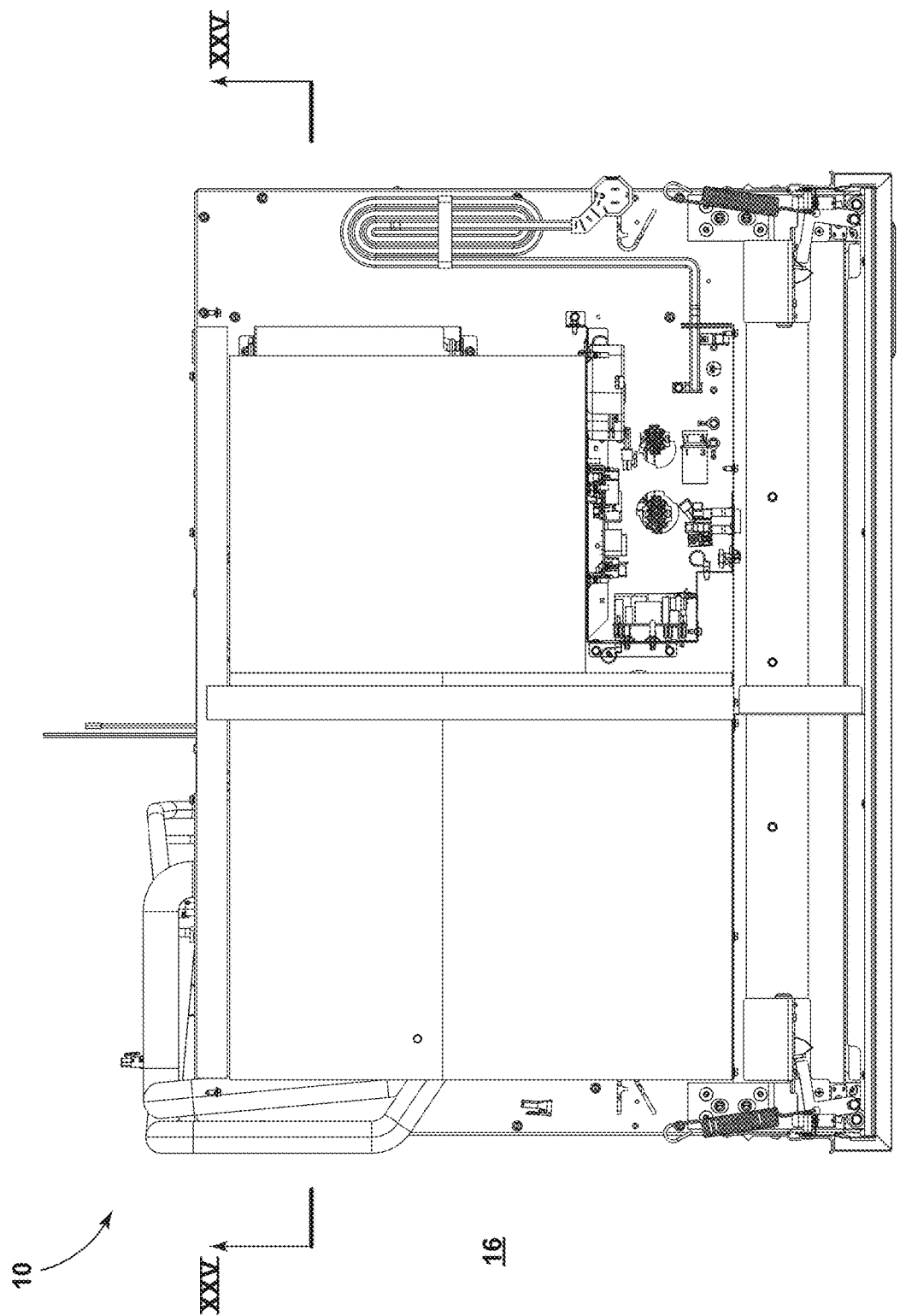
FIG. 24 is a bottom view of the vacuum-insulated structure.
Figure 25:
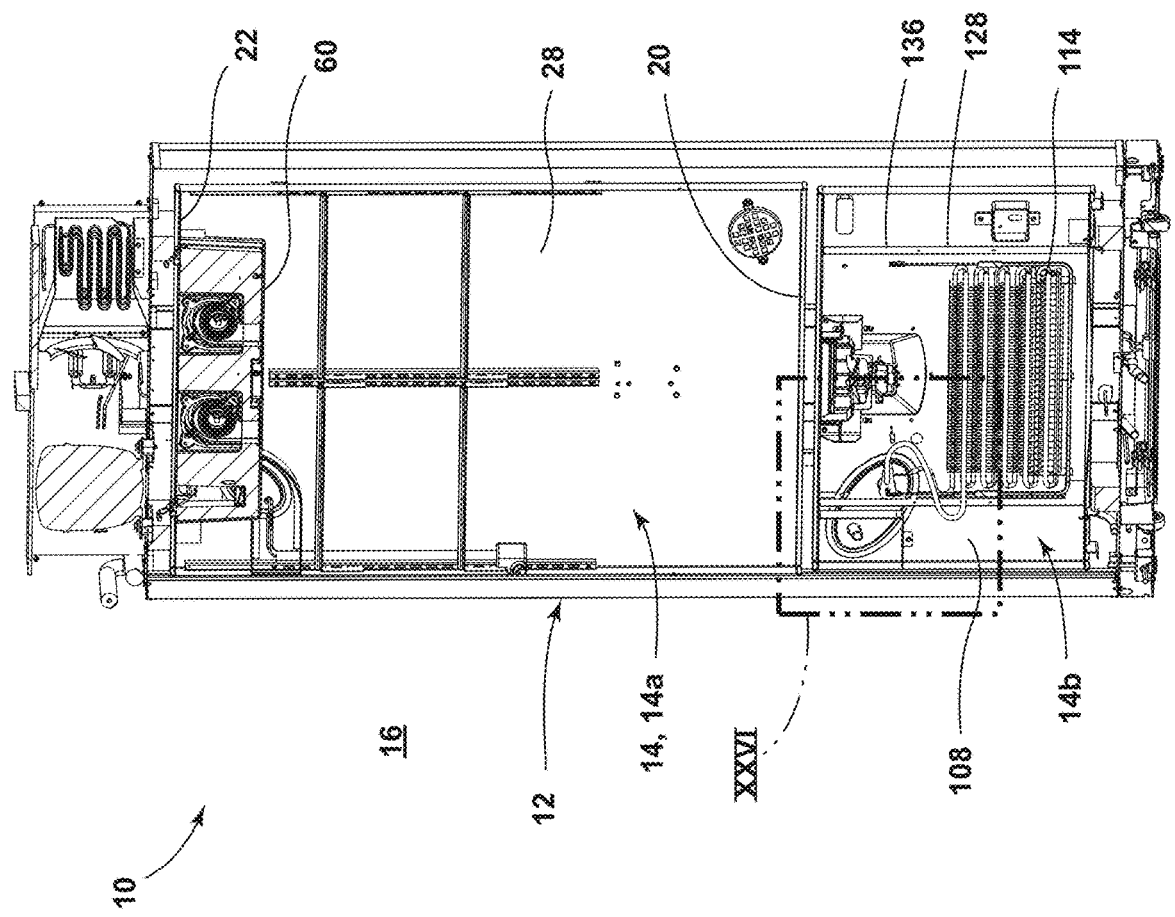
FIG. 25 is an elevational view of a cross-section of the vacuum-insulated structure taken through line XXV-XXV of FIG. 24, illustrating a freezer housing that houses the freezer evaporator and separates the freezer refrigerant line from the conduit portion of the freezer water line.
Figure 26:
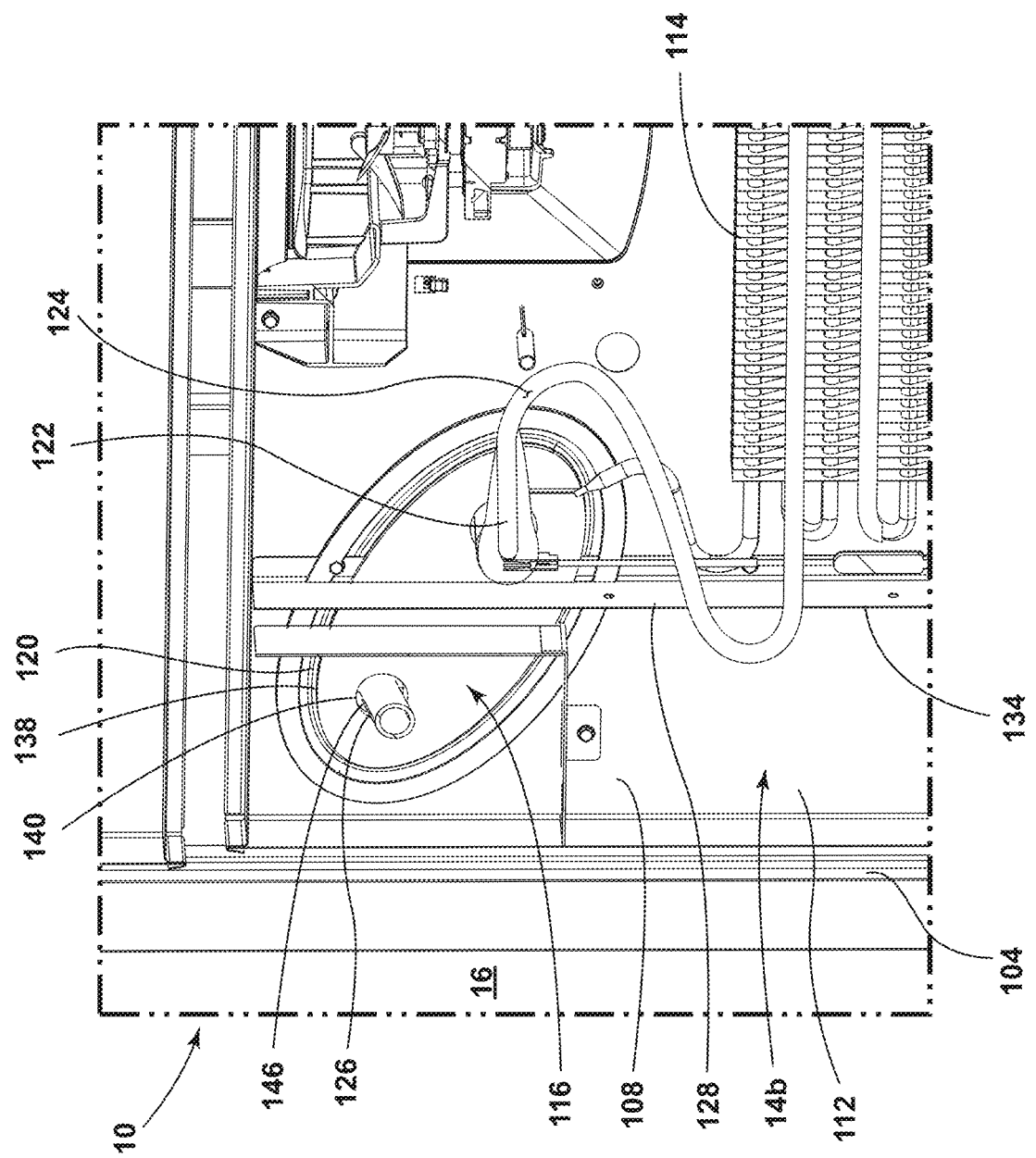
FIG. 26 is a magnified view of area XXVI of FIG. 25, illustrating a sidewall of the housing abutting the grommet and the freezer inner wall of the vacuum-insulated structure that provides the rear wall of the freezer compartment to separate the freezer refrigerant line from the conduit portion of the freezer water line.

Referring additionally to FIGS. 24-26, in embodiments, the refrigeration appliance 10 further includes a freezer housing 128. The freezer housing 128 at least partially houses the freezer evaporator 114 within the freezer compartment 14b. For example, the freezer housing 128 can include a forward wall 130 (see, e.g., FIG. 20) that is forward 132 of the freezer evaporator 114 and that is substantially parallel to the rear wall 108 provided by the freezer inner wall 112 of the vacuum-insulated structure 12. The freezer housing 128 can further include a sidewall 134 and a sidewall 136 that extend between forward wall 130 of the freezer housing 128 and the rear wall 108 provided by the freezer inner wall 112 to at least partially house the freezer evaporator 114. The sidewalls 134, 136 oppose each other with the freezer evaporator 114 disposed therebetween. The sidewall 134 is proximate the freezer pass-through 116. The sidewall 134 physically separates the freezer water line 126 from the freezer refrigerant line 122 where the freezer water line 126 and the freezer refrigerant line 122 extend from the freezer pass-through 116. In embodiments, the sidewall 134 abuts the rear wall 108. The sidewall 134 is positioned to place the freezer refrigerant line 122 to one side of the sidewall 134 and the freezer water line 126 to the other side of the sidewall 134.

With the freezer housing 128 of the freezer evaporator 114 separating the freezer water line 126 from the freezer refrigerant line 122, the freezer refrigerant line 122 is less able to extract sufficient heat from the freezer water line 126 to cause water within the freezer water line 126 to freeze. The freezer housing 128 hinders the transfer of thermal energy from the water within the freezer water line 126 to the freezer refrigerant line 122. The water within the freezer water line 126 is thus less likely to freeze.

Figure 27:
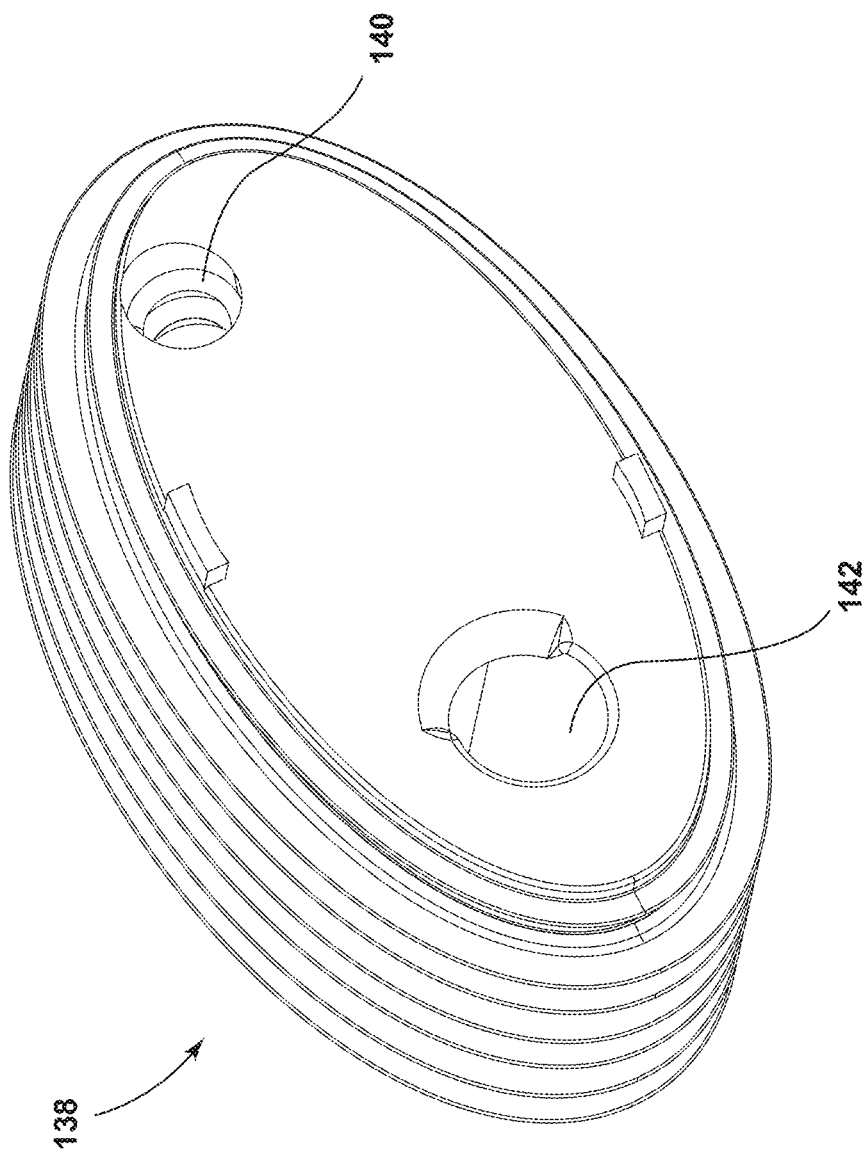
FIG. 27 is a perspective view of the freezer grommet, illustrating separate apertures for the freezer refrigerant line and the freezer water line.

Referring additionally to FIG. 27, in embodiments, the refrigeration appliance 10 further includes a freezer grommet 138 disposed within the freezer pass-through 116. The freezer grommet 138 can help maintain an air-tight seal within the vacuum-insulated structure 12 about the freezer pass-through 116. The freezer grommet 138 can have a rubber or elastomeric composition and be slightly oversized relative to the inner aperture 120 through the freezer inner wall 112 and the second outer aperture 118 through the outer wall 38 that form the freezer pass-through 116 through the vacuum-insulated structure 12. The freezer water line 126 and the freezer refrigerant line 122 extend through the freezer grommet 138. The freezer grommet 138 forms an air-tight seal around the freezer refrigerant line 122 and the freezer water line 126. For example, the freezer grommet 138 includes an aperture 140 through which the freezer water line 126 extends and an aperture 142 through which the freezer refrigerant line 122 extends. The apertures 140, 142 are sized slightly smaller than the outer diameters of the freezer water line 126 and the freezer refrigerant line 122, respectively. The air-tight fitting of the freezer grommet 138 around the freezer refrigerant line 122 and the freezer water line 126 helps limit heat transfer between the external environment 16 and the freezer compartment 14b through the apertures.

Referring back to FIGS. 3, 4, 20, 22, and 23, in embodiments, the refrigeration appliance 10 further includes an ice-maker 144 disposed within the freezer compartment 14b. The freezer water line 126 is in liquid communication with the ice-maker 144. For example, as in the illustrated embodiment, the freezer water line 126 includes a conduit portion 146 and an external portion 148. The external portion 148 is disposed on a side 150 (see, e.g., FIG. 21) of the outer wall 38 of the vacuum-insulated structure 12 that faces the external environment 16 and away from the space 42. The conduit portion 146 connects to the external portion 148 adjacent to the freezer grommet 138. The conduit portion 146 extends downward 82 and forward 132 through the freezer grommet 138 and the freezer pass-through 116 at an angle β relative to horizontal. In embodiments, the angle ß is an acute angle, such as within a range of from 7 degrees to 20 degrees. The conduit portion 146 has an open end 152 disposed within the freezer compartment 14b that is in fluid communication with the ice-maker 144. Further, in embodiments, the conduit portion 146 has an inner diameter 154 that is larger than an inner diameter 156 of the external portion 148 of the freezer water line 126. In use, water flows through the external portion 148 of the freezer water line 126 and into the conduit portion 146 of the freezer water line 126. Water then flows within the conduit portion 146 via the force of gravity through the conduit portion 146 and into the ice-maker 144. Because the inner diameter 154 of the conduit portion 146 is larger than the inner diameter 156 of the external portion 148, and because the conduit portion 146 has the open end 152, water within conduit portion 146 is not suction locked in place and can flow freely into the ice-maker 144. Little or no water remains in the conduit portion 146. Thus, water does not freeze within the conduit portion 146, which would block further flow of water to the ice-maker 144. For example, the ice-maker 144 can include a reservoir 158 disposed at the open end 152 of the conduit portion 146 to collect the water that flows out of the conduit portion 146. The ice-maker 144 then uses the collected water to form ice pieces.

In embodiments, the refrigeration appliance 10 further includes a freezer drain line (not separately illustrated), that is otherwise the same as the drain line 72 of the refrigerable compartment 14 discussed above. The freezer drain line could drain away condensate that forms upon the freezer condenser. The freezer drain line can extend through the freezer grommet 138 along with the freezer refrigerant line 122 and the freezer water line 126.

Extending both the water line 58 and the refrigerant line 52 through the pass-through 46, and extending both the freezer water line 126 and the freezer refrigerant line 122 through the freezer pass-through 116, limits the number apertures through the vacuum-insulated structure 12 that needs to be made in order to provide water dispensing and ice-making capabilities within the refrigerator compartment 14a and the freezer compartment 14b, respectively. Limiting the number of apertures increases the ability of the vacuum-insulated structure 12 to maintain a pressure within the space 42 that is less than atmospheric pressure, which increases the insulation properties of the vacuum-insulated structure 12. The drain line 72, the heater 70, the housing 60, the freezer housing 128, and the geometry and orientation of the conduit portion 146 of the freezer water line 126 all help prevent the refrigerant line 52 and the freezer refrigerant line 122 from freezing the water within the water line 58 and the freezer water line 126 respectively.

According to a first aspect of the present disclosure, a refrigeration appliance comprises: (i) a vacuum-insulated structure defining a refrigerable compartment, the vacuum-insulated structure comprising a pass-through therethrough providing access from an external environment to the refrigerable compartment; (ii) an evaporator disposed within the refrigerable compartment, the evaporator configured to lower or maintain a temperature of the refrigerable compartment below ambient temperature; (iii) a refrigerant line that extends through the pass-through and into the refrigerable compartment, the refrigerant line in fluid communication with the evaporator; (iv) a water line extending through the pass-through and into the refrigerable compartment; and (v) a housing that at least partially houses the evaporator within the refrigerable compartment, the housing comprising a wall proximate the pass-through that separates the water line from the refrigerant line where the water line and the refrigerant line extend from the pass-through and into the refrigerable compartment.

According to a second aspect of the present disclosure, the refrigeration appliance of the first aspect further comprises: a drain line extending through the pass-through, the drain line configured and positioned to drain away condensate that forms upon the evaporator.

According to a third aspect of the present disclosure, the refrigeration appliance of the second aspect is presented, wherein the refrigerant line is disposed closer to the drain line than to the water line within the pass-through.

According to a fourth aspect of the present disclosure, the refrigeration appliance of any one of the first through the third aspects further comprises: a grommet disposed within the pass-through, the grommet maintaining an air-tight seal within the vacuum-insulated structure about the pass-through, wherein (i) the water line and the refrigerant line extend through the grommet, the grommet forming an air-tight seal around the refrigerant line and the water line; and (ii) the pass-through and the grommet are disposed elevationally below the evaporator.

According to a fifth aspect of the present disclosure, the refrigeration appliance of the fourth aspect further comprises: one or more electrical wires extending through the grommet, wherein, the one or more electrical wires are disposed a distance of greater than or equal to 5 cm away from the water line while extending through the grommet.

According to a sixth aspect of the present disclosure, the refrigeration appliance of any one of the fourth through the fifth aspects further comprises: a drain line extending through the pass-through, the drain line configured and positioned to drain away condensate that forms upon the evaporator; wherein, the drain line also extends through the grommet, with the grommet forming an air-tight seal around the drain line, and with the refrigerant line disposed closer to the drain line than the water line.

According to a seventh aspect of the present disclosure, the refrigeration appliance of any one of the first through the sixth aspects further comprises: a heater disposed proximate the water line near where the water line enters the refrigerable compartment from the pass-through.

According to an eighth aspect of the present disclosure, the refrigeration appliance of any one of the first through the seventh aspects is presented, wherein (i) the vacuum-insulated structure comprises an outer wall, an inner wall facing the outer wall, and a space separating the outer wall from the inner wall; (ii) the pass-through comprises an outer aperture through the outer wall and an inner aperture through the inner wall that is aligned with the outer aperture; and (iii) the space disposed between the outer wall and the inner wall has a pressure that is less than ambient pressure of the external environment.

According to a ninth aspect of the present disclosure, the refrigeration appliance of any one of the first through the eighth aspects further comprises: a water dispenser disposed within the refrigerable compartment; wherein (i) the refrigerable compartment is configured to maintain a temperature within a range of from greater than 0° C. to 8° C.; and (ii) the water line is in liquid communication with the water dispenser.

According to a tenth aspect of the present disclosure, the refrigeration appliance of any one of the first through the ninth aspects further comprises: an ice-maker disposed within the refrigerable compartment; wherein (i) the refrigerable compartment is configured to maintain a temperature that is less than or equal to 0° C.; and (ii) the water line is in liquid communication with the ice-maker.

According to an eleventh aspect of the present disclosure, a refrigeration appliance comprises: (a) a vacuum-insulated structure defining a refrigerator compartment and a freezer compartment, the vacuum-insulated structure comprising (i) a refrigerator pass-through therethrough providing access from an external environment to the refrigerator compartment and (ii) a freezer pass-through therethrough providing access from the external environment to the freezer compartment; (b) a refrigerator evaporator disposed within the refrigerator compartment, the refrigerator evaporator configured to lower or maintain a temperature of the refrigerator compartment below ambient temperature; (c) a freezer evaporator disposed within the freezer compartment, the freezer evaporator configured to lower or maintain a temperature of the freezer compartment below ambient temperature; (d) a refrigerator refrigerant line that extends through the refrigerator pass-through and into the refrigerator compartment, the refrigerator refrigerant line in fluid communication with the evaporator; (e) a freezer refrigerant line that extends through the freezer pass-through and into the freezer compartment, the freezer refrigerant line in fluid communication with the evaporator; (f) a refrigerator water line extending through the refrigerator pass-through and into the refrigerator compartment; (g) a freezer water line extending through the freezer pass-through and into the freezer compartment; (h) a refrigerator housing that at least partially houses the refrigerator evaporator within the refrigerator compartment, the refrigerator housing comprising a wall proximate the refrigerator pass-through that separates the refrigerator water line from the refrigerator refrigerant line where the refrigerator water line and the refrigerator refrigerant line extend from the refrigerator pass-through and into the refrigerator compartment; and (i) a freezer housing that at least partially houses the freezer evaporator within the freezer compartment, the freezer housing comprising a wall proximate the freezer pass-through that separates the freezer water line from the freezer refrigerant line where the freezer water line and the freezer refrigerant line extend from the freezer pass-through and into the freezer compartment.

According to a twelfth aspect of the present disclosure, the refrigeration appliance of the eleventh aspect further comprises: (a) a refrigerator grommet disposed within the refrigerator pass-through, the refrigerator grommet maintaining an air-tight seal within the vacuum-insulated structure about the refrigerator pass-through; and (b) a freezer grommet disposed within the freezer pass-through, the freezer grommet maintaining an air-tight seal within the vacuum-insulated structure about the freezer pass-through; wherein (i) the refrigerator water line and the refrigerator refrigerant line extend through the refrigerator grommet, the refrigerator grommet forming an air-tight seal around the refrigerator water line and the refrigerator refrigerant line; and (ii) the freezer water line and the freezer refrigerant line extend through the freezer grommet, the freezer grommet forming an air-tight seal around the freezer water line and the freezer refrigerant line.

According to a thirteenth aspect of the present disclosure, the refrigeration appliance of any one of the eleventh through twelfth aspects is presented, wherein (i) the refrigerator refrigerant line and the freezer refrigerant line each comprise a surface with a temperature less than or equal to 0° C.; and (ii) the refrigerator water line and the freezer water line each transport water having a temperature above 0° C.

According to a fourteenth aspect of the present disclosure, the refrigeration appliance of any one of the eleventh through the thirteenth aspects further comprises: a refrigerator drain line extending through the refrigerator pass-through, the refrigerator drain line configured and positioned to drain away condensate that forms upon the refrigerator evaporator; wherein the refrigerator drain line also extends through the refrigerator grommet, with the refrigerator grommet forming an air-tight seal around the refrigerator drain line, and with the refrigerator refrigerant line disposed closer to the refrigerator drain line than the refrigerator water line.

According to a fifteenth aspect of the present disclosure, the refrigeration appliance of the fourteenth aspect is presented, wherein (i) the refrigerator refrigerant line and the freezer refrigerant line each comprise a surface with a temperature less than or equal to 0° C.; and (ii) the refrigerator water line, the freezer water line, and the refrigerator drain line each transport water having a temperature above 0° C.

According to a sixteenth aspect of the present disclosure, the refrigeration appliance of any one of the eleventh through the fifteenth aspects further comprises: an ice-maker disposed within the freezer compartment; wherein (i) the freezer water line comprises a conduit portion with an open end in fluid communication with the ice-maker, and (ii) the freezer water line comprises a conduit portion with an open end in fluid communication with the ice-maker, and According to a seventeenth aspect of the present disclosure, the refrigeration appliance of the sixteenth aspect is presented, wherein the conduit portion comprises an inner diameter that is larger than an inner diameter of an external portion of the freezer water line leading to the conduit portion disposed exterior of the outer wall of the vacuum-insulated structure.

According to an eighteenth aspect of the present disclosure, a refrigeration appliance comprises: (a) a vacuum-insulated structure defining a freezer compartment, the vacuum-insulated structure comprising (i) a freezer pass-through therethrough providing access from an external environment to the freezer compartment; (b) an ice-maker disposed within the freezer compartment; and (c) a freezer water line extending through the freezer pass-through and into the freezer compartment, the freezer water line comprising a conduit portion with an open end in fluid communication with the ice-maker; wherein, the conduit portion extends through the freezer pass-through at an acute angle relative to horizontal so that water is able to flow via force of gravity through the conduit portion and into the ice-maker.

According to a nineteenth aspect of the present disclosure, the refrigeration appliance of the eighteenth aspect further comprises: (i) a freezer evaporator disposed within the freezer compartment, the freezer evaporator configured to lower or maintain a temperature of the freezer compartment below ambient temperature; (ii) a freezer refrigerant line that extends through the freezer pass-through and to the freezer evaporator disposed within the freezer compartment; and (iii) a freezer housing that houses the freezer evaporator within the freezer compartment, the freezer housing comprising a wall proximate the freezer pass-through that separates the freezer water line from the freezer refrigerant line where the freezer water line and the freezer refrigerant line extend from the freezer pass-through and into the freezer compartment.

According to a twentieth aspect of the present disclosure, the refrigeration appliance of any one of the eighteenth through the nineteenth aspects further comprises: a freezer grommet sealing the freezer pass-through; wherein, the freezer water line and the freezer refrigerant line extend through the freezer grommet, with the freezer grommet forming an air-tight seal around the freezer water line and the freezer refrigerant line.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A refrigeration appliance comprising:
   a vacuum-insulated structure comprising (i) an outer wall, (ii) an inner wall facing the outer wall, the inner wall defining a refrigerable compartment, (iii) a space separating the outer wall from the inner wall, the space having a pressure that is less than ambient pressure of an external environment, and (iv) a pass-through through the vacuum-insulated structure providing access from the external environment to the refrigerable compartment, the pass-through comprising an outer aperture through the outer wall and an inner aperture through the inner wall that is aligned with the outer aperture;
   an evaporator disposed within the refrigerable compartment, the evaporator configured to lower or maintain a temperature of the refrigerable compartment below ambient temperature;
   one or more of a water dispenser and an ice-maker disposed within the refrigerable compartment;
   a refrigerant line that extends through the pass-through and into the refrigerable compartment, the refrigerant line in fluid communication with the evaporator;
   a water line extending through the pass-through and into the refrigerable compartment, the water line in liquid communication with the one or more of the water dispenser and the ice-maker; and
   a housing that at least partially houses the evaporator within the refrigerable compartment, the housing comprising a wall directly adjacent the pass-through that entirely separates the water line from the refrigerant line where the water line and the refrigerant line extend from the pass-through and into the refrigerable compartment to at least partially thermally insulate the water line from the refrigerant line within the refrigerable compartment.

2. The refrigeration appliance of claim 1 further comprising:
   a drain line extending through the pass-through, the drain line configured and positioned to drain away condensate that forms upon the evaporator.

3. The refrigeration appliance of claim 2, wherein
   the refrigerant line is disposed closer to the drain line than to the water line within the pass-through.

4. The refrigeration appliance of claim 1 further comprising:
   a grommet disposed within the pass-through, the grommet maintaining an air-tight seal within the vacuum-insulated structure about the pass-through,
   wherein, the water line and the refrigerant line extend through the grommet, the grommet forming an air-tight seal around the refrigerant line and the water line; and
   wherein, the pass-through and the grommet are disposed elevationally below the evaporator.

5. The refrigeration appliance of claim 4 further comprising:
   one or more electrical wires extending through the grommet,
   wherein, the one or more electrical wires are disposed a distance of greater than or equal to 5 cm away from the water line while extending through the grommet.

6. The refrigeration appliance of claim 4 further comprising:
   a drain line extending through the pass-through, the drain line configured and positioned to drain away condensate that forms upon the evaporator;
   wherein, the drain line also extends through the grommet, with the grommet forming an air-tight seal around the drain line, and with the refrigerant line disposed closer to the drain line than the water line.

7. The refrigeration appliance of claim 1 further comprising:
a heater disposed proximate the water line near where the water line enters the refrigerable compartment from the pass-through.

8. The refrigeration appliance of claim 1 further comprising:
the water dispenser disposed within the refrigerable compartment;
wherein, the refrigerable compartment is configured to maintain a temperature within a range of from greater than 0° C. to 8° C.; and
wherein, the water line is in liquid communication with the water dispenser.

9. The refrigeration appliance of claim 1 further comprising:
the ice-maker disposed within the refrigerable compartment;
wherein, the refrigerable compartment is configured to maintain a temperature that is less than or equal to 0° C.; and
wherein, the water line is in liquid communication with the ice-maker.

10. A refrigeration appliance comprising:
a vacuum-insulated structure defining a refrigerator compartment and a freezer compartment, the vacuum-insulated structure comprising (i) a refrigerator pass-through therethrough providing access from an external environment to the refrigerator compartment and (ii) a freezer pass-through therethrough providing access from the external environment to the freezer compartment;
a refrigerator evaporator disposed within the refrigerator compartment, the refrigerator evaporator configured to lower or maintain a temperature of the refrigerator compartment below ambient temperature;
a freezer evaporator disposed within the freezer compartment, the freezer evaporator configured to lower or maintain a temperature of the freezer compartment below ambient temperature;
a refrigerator refrigerant line that extends through the refrigerator pass-through and into the refrigerator compartment, the refrigerator refrigerant line in fluid communication with the refrigerator evaporator;
a freezer refrigerant line that extends through the freezer pass-through and into the freezer compartment, the freezer refrigerant line in fluid communication with the freezer evaporator;
a refrigerator water line extending through the refrigerator pass-through and into the refrigerator compartment;
a freezer water line extending through the freezer pass-through and into the freezer compartment;
a refrigerator housing that at least partially houses the refrigerator evaporator within the refrigerator compartment, the refrigerator housing comprising a wall directly adjacent the refrigerator pass-through that entirely separates the refrigerator water line from the refrigerator refrigerant line where the refrigerator water line and the refrigerator refrigerant line extend from the refrigerator pass-through and into the refrigerator compartment to at least partially thermally insulate the refrigerator water line from the refrigerator refrigerant line within the refrigerator compartment; and
a freezer housing that at least partially houses the freezer evaporator within the freezer compartment, the freezer housing comprising a wall directly adjacent the freezer pass-through that entirely separates the freezer water line from the freezer refrigerant line where the freezer water line and the freezer refrigerant line extend from the freezer pass-through and into the freezer compartment to at least partially thermally insulate the freezer water line from the freezer refrigerant line within the freezer compartment.

11. The refrigeration appliance of claim 10 further comprising:
a refrigerator grommet disposed within the refrigerator pass-through, the refrigerator grommet maintaining an air-tight seal within the vacuum-insulated structure about the refrigerator pass-through; and
a freezer grommet disposed within the freezer pass-through, the freezer grommet maintaining an air-tight seal within the vacuum-insulated structure about the freezer pass-through;
wherein, the refrigerator water line and the refrigerator refrigerant line extend through the refrigerator grommet, the refrigerator grommet forming an air-tight seal around the refrigerator water line and the refrigerator refrigerant line; and
wherein, the freezer water line and the freezer refrigerant line extend through the freezer grommet, the freezer grommet forming an air-tight seal around the freezer water line and the freezer refrigerant line.

12. The refrigeration appliance of claim 10, wherein
the refrigerator refrigerant line and the freezer refrigerant line each comprise a surface with a temperature less than or equal to 0° C.; and
the refrigerator water line and the freezer water line each transport water having a temperature above 0° C.

13. The refrigeration appliance of claim 10, further comprising:
a refrigerator drain line extending through the refrigerator pass-through, the refrigerator drain line configured and positioned to drain away condensate that forms upon the refrigerator evaporator;
wherein, the refrigerator drain line also extends through the refrigerator grommet, with the refrigerator grommet forming an air-tight seal around the refrigerator drain line, and with the refrigerator refrigerant line disposed closer to the refrigerator drain line than the refrigerator water line.

14. The refrigeration appliance of claim 13, wherein
the refrigerator refrigerant line and the freezer refrigerant line each comprise a surface with a temperature less than or equal to 0° C.; and
the refrigerator water line, the freezer water line, and the refrigerator drain line each transport water having a temperature above 0° C.

15. The refrigeration appliance of claim 10 further comprising:
an ice-maker disposed within the freezer compartment;
wherein, the freezer water line comprises a conduit portion with an open end in fluid communication with the ice-maker, and
wherein, the conduit portion extends through the freezer pass-through at an acute angle relative to horizontal so that water is able to flow via force of gravity through the conduit portion and into the ice-maker.

16. The refrigeration appliance of claim 15, wherein
the conduit portion comprises an inner diameter that is larger than an inner diameter of an external portion of the freezer water line leading to the conduit portion disposed exterior of an outer wall of the vacuum-insulated structure.

17. A refrigeration appliance comprising:
a vacuum-insulated structure defining a freezer compartment, the vacuum-insulated structure comprising (i) a rear wall and (ii) a freezer pass-through through the rear wall providing access from an external environment to the freezer compartment;
an ice-maker disposed within the freezer compartment; and
a freezer water line extending through the freezer pass-through and into the freezer compartment, the freezer water line comprising a conduit portion with an open end in fluid communication with the ice-maker;
wherein, the conduit portion extends through the freezer pass-through solely at an acute angle relative to horizontal in the forward and downward directions so that water is able to flow via force of gravity through an entirety of the conduit portion and into the ice-maker, and
wherein, the conduit portion extends into the freezer compartment; and wherein, the refrigeration appliance further comprises a freezer refrigerant line and a freezer housing that houses a freezer evaporator within the freezer compartment, the freezer housing comprising a wall proximate the freezer pass-through that separates the freezer water line from the freezer refrigerant line where the freezer water line and the freezer refrigerant line extend from the freezer pass-through and into the freezer compartment.

18. The refrigeration appliance of claim 17, wherein:
the freezer refrigerant line extends through the freezer pass-through and to the freezer evaporator disposed within the freezer compartment, and wherein the freezer evaporator is configured to lower or to maintain a temperature of the freezer compartment below ambient temperature.

19. The refrigeration appliance of claim 17 further comprising:
a freezer grommet sealing the freezer pass-through;
wherein, the freezer water line and the freezer refrigerant line extend through the freezer grommet, with the freezer grommet forming an air-tight seal around the freezer water line and the freezer refrigerant line.

\* \* \* \* \*